(12) United States Patent
Moriwake et al.

(10) Patent No.: US 6,201,581 B1
(45) Date of Patent: Mar. 13, 2001

(54) VIDEO SIGNAL PROCESSING DEVICE AND METHOD, IMAGE SYNTHESIZING DEVICE, AND EDITING DEVICE

(75) Inventors: Katsuakira Moriwake, Tokyo; Tatsunobu Ando; Katsuro Matsuzaki, both of Kanagawa; Atsushi Tsukahara, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/171,401

(22) PCT Filed: Feb. 20, 1998

(86) PCT No.: PCT/JP98/00712
§ 371 Date: Apr. 5, 1999
§ 102(e) Date: Apr. 5, 1999

(87) PCT Pub. No.: WO98/37702
PCT Pub. Date: Aug. 27, 1998

(30) Foreign Application Priority Data

Feb. 20, 1997 (JP) .................................................. 9-035406
Jul. 3, 1997 (JP) .................................................. 9-193201

(51) Int. Cl.$^7$ .................................................. H04N 9/75
(52) U.S. Cl. .................................................. 348/587; 348/592
(58) Field of Search .................................................. 348/586, 587, 348/590, 591, 592; H04N 9/75

(56) References Cited

U.S. PATENT DOCUMENTS 5,903,318 * 5/1999 Demay .................................................. 348/592
5,923,381 * 7/1999 Demay .................................................. 348/592

FOREIGN PATENT DOCUMENTS

| 4-70292 | 3/1992 | (JP) . |
| 4-150396 | 5/1992 | (JP) . |
| 6-225329 | 8/1994 | (JP) . |
| 7-15743 | 1/1995 | (JP) . |
| 8-65705 | 3/1996 | (JP) . |
| 8-102961 | 4/1996 | (JP) . |
| 8-153201 | 6/1996 | (JP) . |
| 8-275196 | 10/1996 | (JP) . |

* cited by examiner

*Primary Examiner*—Sherrie Hsia
(74) *Attorney, Agent, or Firm*—Frommer Lawrence & Haug LLP; William S. Frommer; Joe H. Shallenburger

(57) ABSTRACT

In synthesizing a foreground picture and a background picture in accordance with a key signal, for example, by soft chroma key processing, a preview screen 102 as a picture as a result of processing by the key signal and a key parameter setting screen 101 for setting characteristics of the key signal are displayed. Characteristics of the key signal are changed on a three-dimensional space by information obtained through the key parameter setting screen 101, and the picture as a result of processing is changed on the preview screen 102. Thus, even when the range of key signal setting is adjusted on the three-dimensional color space, desired processing may be carried out by simple operation.

45 Claims, 30 Drawing Sheets

FIG.16A
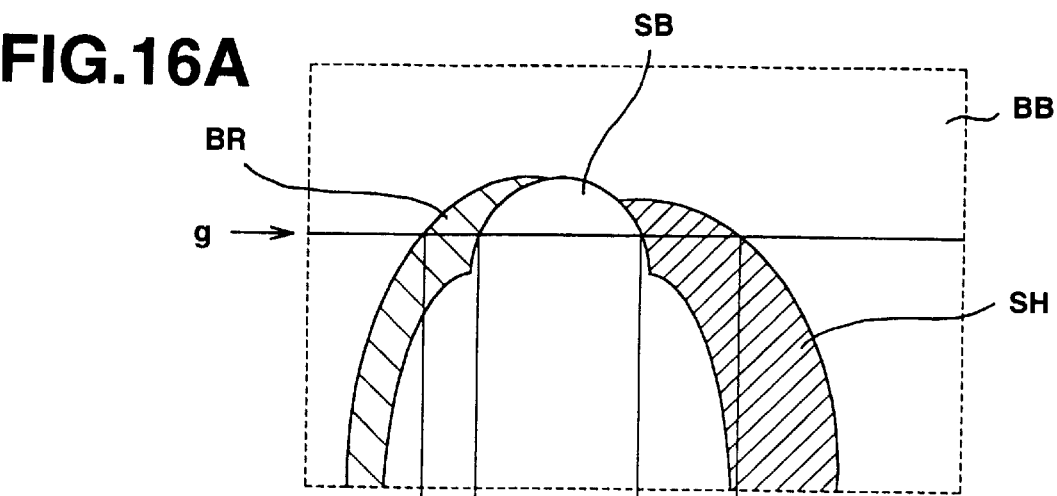
FIG.16B
Y1
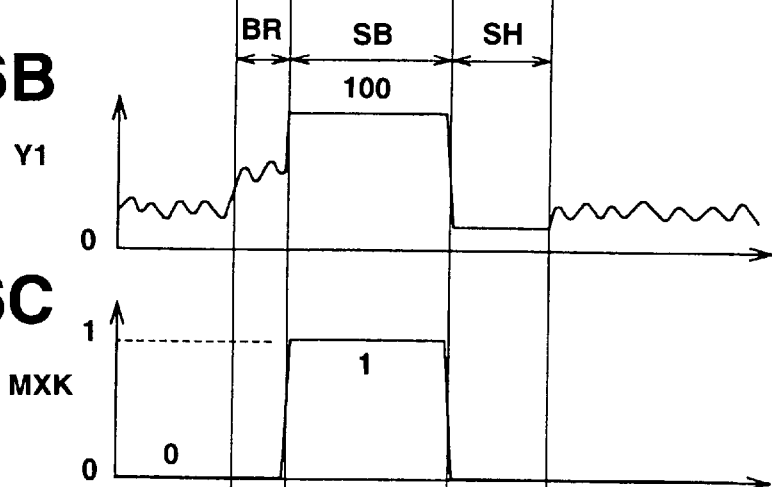
FIG.16C
MXK
FIG.16D
MXKxY1
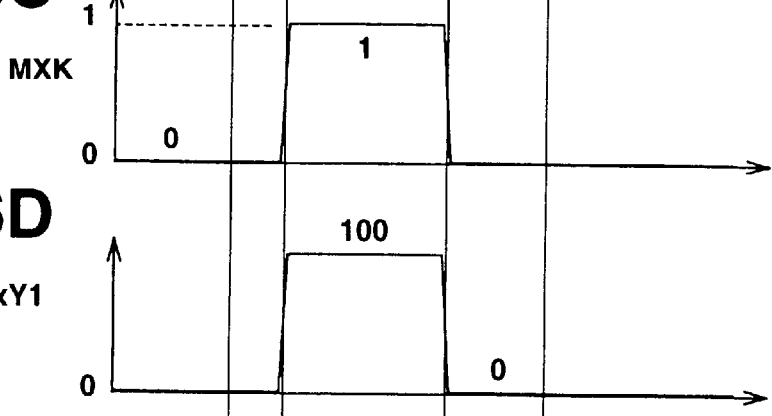
FIG.16E
CCK
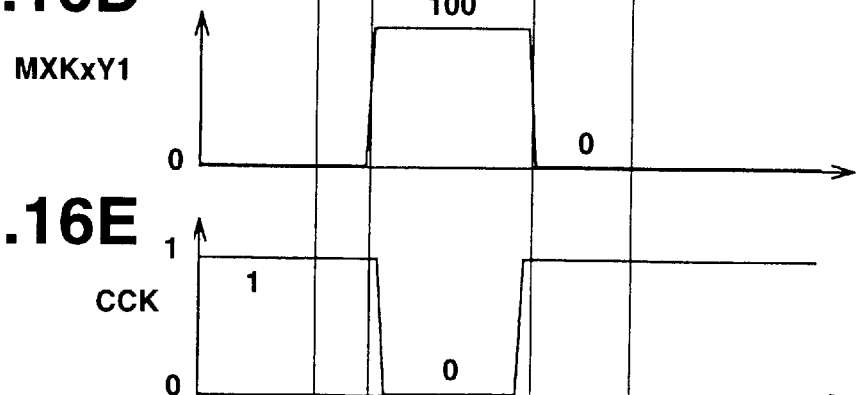
FIG.16F
Y1-CCKxY0C
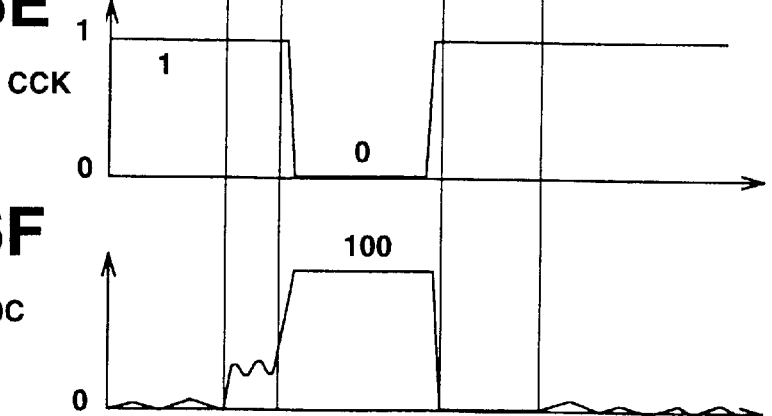

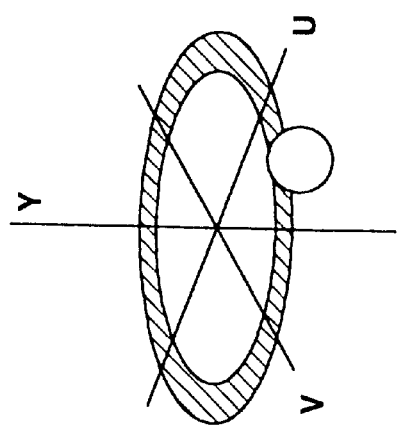
FIG.34A
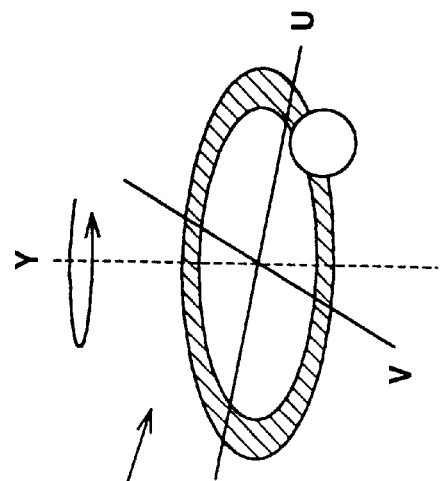
FIG.34D
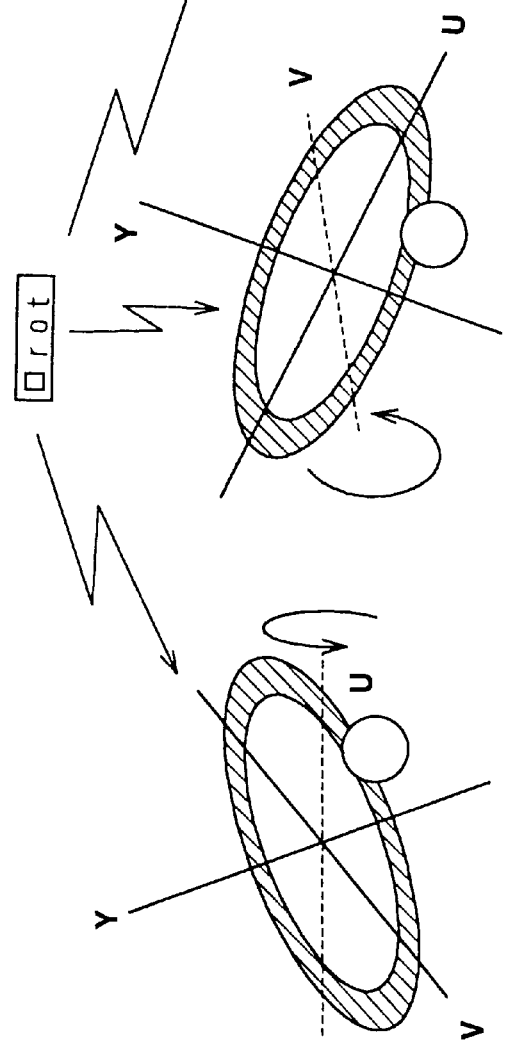
FIG.34C
FIG.34B

VIDEO SIGNAL PROCESSING DEVICE AND METHOD, IMAGE SYNTHESIZING DEVICE, AND EDITING DEVICE

TECHNICAL FIELD

This invention relates to an image signal processing device and method, a picture synthesizing device, and an editing device which are used for picture synthesis employing a so-called chroma key.

BACKGROUND OF THE INVENTION

Conventionally, in chroma key processing using an editing device at a broadcasting station or the like, picture synthesis is carried out by inserting a background picture into a foreground picture.

Specifically, at a broadcasting station or the like, for example, an announcer is imaged with a screen of blue color as a background (so-called blue back), thereby generating an image signal of a foreground picture. Also, a desired object to be allocated to the background of the foreground picture is imaged, thereby generating an image signal of a background picture.

In an editing device or the like, in response to the operation by an operator, a color to be extracted from the foreground picture is preset by setting a reference signal level with respect to color-difference signals. In the case where picture synthesis is to be carried out by using a soft chroma key, in the editing device, lower limit and upper limit signal levels (that is, threshold values) are set with reference to a center color of the color to be extracted.

The editing device generates a key signal by sequentially comparing the threshold values with the image signal of the foreground picture. Specifically, with respect to the foreground picture generated with the background of blue color screen, the editing device generates a key signal by setting the upper limit and lower limit threshold values so that a value 0 is obtained in the background part while a value 1 is obtained with colors other than the blue color of the background. With respect to other bluish colors, a key signal is generated within a range of the value 1 to the value 0 corresponding to the upper limit and lower limit threshold values so that a value corresponding to the degree of blueness is obtained.

Thus, the conventional editing device generates a key signal by sequentially discriminating the color of the foreground picture, using a two-dimensional color space expressed by color-difference signals (that is, a color space with UV signals as coordinate axes). The editing device synthesizes the foreground picture and the background picture with reference to the key signal thus generated, so as to generate a synthetic picture such that the background picture is inserted in the background of the foreground picture.

Meanwhile, in the conventional editing device, it is difficult to discriminate a portion of a high luminance level and a portion of a low luminance level with the same color. Therefore, with respect to a synthetic picture generated by the conventional editing device, there arises a problem such that the contour of the inserted background picture is displayed in an unnatural manner, thus lowering the definition in comparison with the case where no chroma key processing is carried out.

As a method for solving this problem, it may be considered to express and process each pixel of the foreground picture on a three-dimensional color space. In this method, however, the range of key signal setting must be adjusted on the three-dimensional color space instead of the conventional two-dimensional color space, and therefore the operation to adjust chroma key processing might be complicated.

DISCLOSURE OF THE INVENTION

In view of the foregoing problem, it is an object of the present invention to provide an image signal processing device and method, a picture synthesizing device, and an editing device which enable picture synthesis of high definition with a simple structure and enable desired processing by simple operation.

In an image signal processing device and method according to the present invention, in generating a key signal for synthesizing a foreground picture and a background picture, a polar coordinate of each pixel of the foreground picture is detected in a three-dimensional color space having a center color of a color to be extracted from the foreground picture as an origin, and the key signal is generated in accordance with the distance of the polar coordinate from the origin.

Also, in generating a key signal for synthesizing a foreground picture and a background picture, the value of the key signal is set in accordance with the distance from a predetermined reference color in a three-dimensional color space to each pixel of the foreground picture, and a picture as a result of processing by the key signal and a characteristic setting screen for the key signal are displayed. The n, characteristics of the key signals are changed by information obtained through the characteristic setting screen, and the picture as a result of processing is changed.

In addition, in generating a key signal for synthesizing a foreground picture and a background picture, the value of the key signal is set in accordance with the distance of each pixel of the foreground picture from a reference center color in a three-dimensional color space, and position information of a pixel designated in the foreground picture from a predetermined reference position in the three-dimensional color space.

Also, in generating a key signal for synthesizing a foreground picture and a background picture, a pixel forming the foreground picture is projected on a reference plane set on a three-dimensional color space, thus displaying the position of the pixel forming the foreground picture on the three-dimensional color space.

In addition, in generating a key signal for synthesizing a foreground picture and a background picture, the value of the key signal is set in accordance with the distance from a predetermined reference color in a three-dimensional color space, and each pixel of at least the foreground picture is located at a corresponding position on the three-dimensional color space, thus displaying a picture viewed from a desired viewpoint.

The key signal generating, device and method having such characteristics may be applied to a picture synthesizing device based on the frame unit and an editing device for carrying out editing of a plurality of frames.

BRIEF DESCRIPTION OF THE DRAWINGS

FIGS. 16A to 16F illustrate picture synthesis which employs add-mix synthesis.

FIG. 34 illustrates rotation of a color space in the color space display section.

BEST MODE FOR CARRYING OUT THE INVENTION

Preferred embodiments of the present invention will now be described with reference to the drawings.

First, an example of an editing device to which an embodiment of the key signal generating device of the present invention is applied will be described with reference to FIG. 1.

Figure 1:
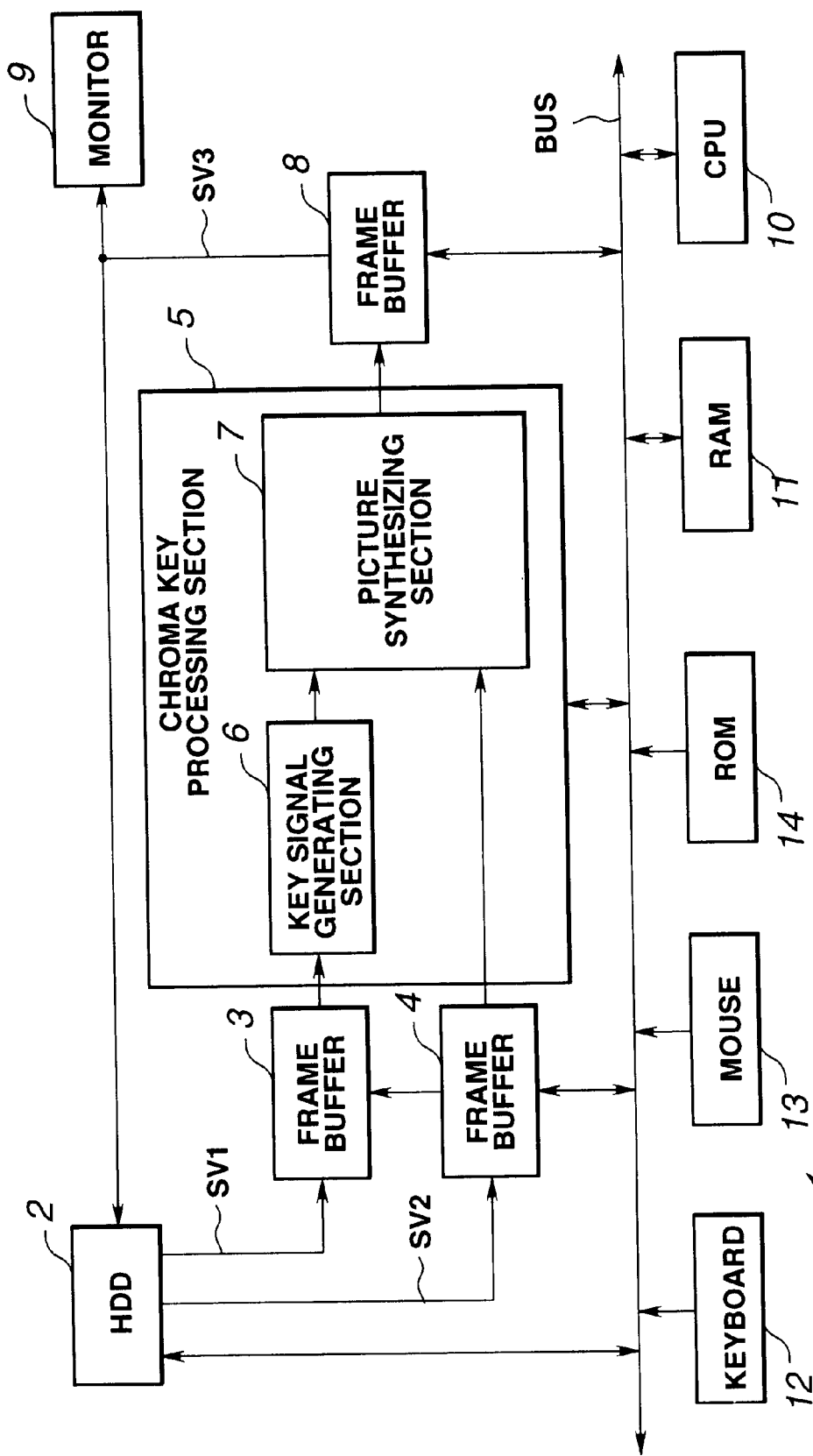
FIG. 1 is a block diagram showing the schematic structure of an editing device to which an embodiment of the present invention is applied.

FIG. 1 is a block diagram showing the schematic structure of an editing device 1 for carrying out picture synthesis by chroma key processing and color cancel processing.

The editing device 1 shown in FIG. 1 is constituted by arranging a picture processing board onto a computer. The editing device 1 is adapted for recording various image signals onto a hard disk drive (HDD) 2 in response to the operation by an operator, then editing the recorded image signals, and outputting the edited image signals to an external equipment. In this case, the editing device 1 synthesizes image signals SV1 and SV2 of a foreground and a background recorded on the hard disk drive 2 so as to generate an image signal SV3 of a synthetic picture, and records this image signal SV3 onto the hard disk drive 2.

Specifically, the hard disk drive 2 switches the operation in response to a control command inputted through a bus BUS, so as to record an image signal necessary for editing of the editing device 1 and output the recorded image signal. Frame buffers 3 and 4 switch the operation in response to control data similarly inputted through a bus BUS, so as to store the image signals SV1 and SV2 sequentially inputted thereto, respectively, and output the image signals at a predetermined timing. A chroma key processing section 5 synthesizes the image signals SV1 and SV2 inputted from the frame buffers 3 and 4 by a chroma key method, and outputs the image signal SV3 constituting the synthetic picture. Therefore, in the chroma key processing section 5, a key signal generating section 6 generates a key signal from the image signal SV1 of the foreground picture, and a picture synthesizing section 7 generates the image signal SV3 by this key signal.

Figure 2:
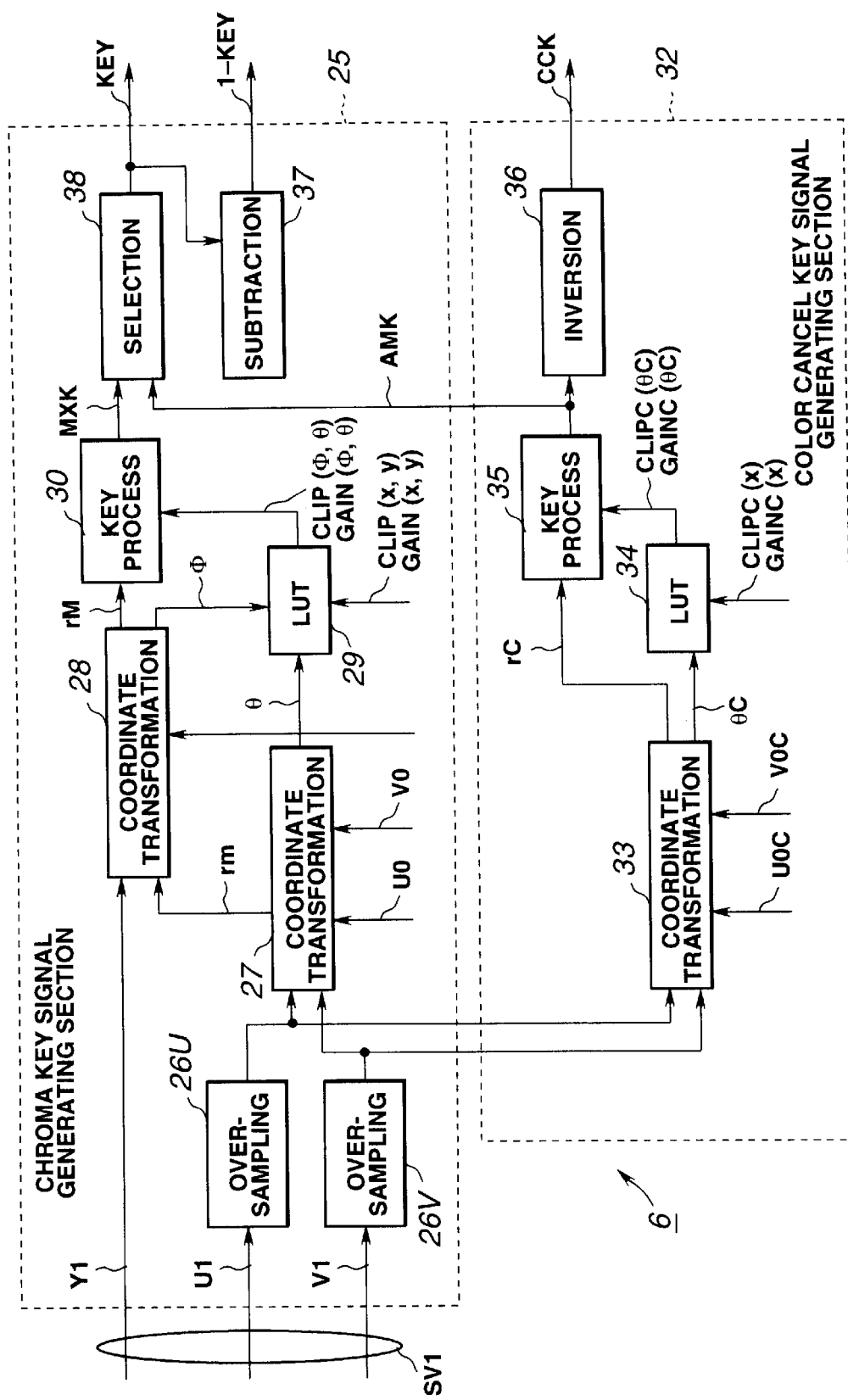
FIG. 2 is a block diagram showing an example of a key signal generating device as an embodiment of the present invention.

As the key signal generating section 6 in the chroma key processing section 5, a structure as shown in FIG. 2 as an embodiment of the present invention may be used. The key signal generating section 6 of FIG. 2 will be later described in detail.

Referring to FIG. 1 again, a frame buffer 8 stores the image signal SV3 outputted from the chroma key processing section 5, and outputs the image signal SV3 to the hard disk drive 2 and a monitor 9 at a predetermined timing. Thus, in the editing device 1, the image signal SV3 chroma key processed by the chroma key processing section 5 is confirmed on the monitor 9, and recorded onto the hard disk drive 2. In the editing device 1, the frame buffers 3, 4, 8 and the chroma key processing section 5 are constituted on the board, and this board is connected to a bus BUS of the computer.

A central processing unit (CPU) 10 secures a work area in a random access memory (RAM) 11, and carries out a series of processing procedures stored on a read-only memory (ROM) 14 and the hard disk drive in response to the operation on a keyboard 12 and a mouse 13. Thus, the central processing unit 10 prepares an editing list necessary for processing of this editing device and controls the entire operation in accordance with the prepared editing list, thereby carrying out a series of editing processing in accordance with the operation by the operator.

In this series of processing, when the operator selects editing by chroma key, the central processing unit 10 starts the operation of the chroma key processing section 5 and the frame buffers 3, 4, 8, so as to carry out chroma key processing. In this processing, after accepting conditions setting of chroma key processing, the central processing unit 10 carries out parameter setting processing of the chroma key processing section 5 in accordance with the accepted conditions, and starts chroma key processing by the set parameter.

Specifically, in the processing of condition setting, the central processing unit 10 displays a still picture of the foreground picture on the monitor 9, and when the operator moves a cursor on the monitor and clicks the mouse 13, the central processing unit 10 sets a corresponding pixel to a pixel of a center color. The center color is a reference color of a portion to be extracted from the foreground picture. In this editing device 1, the hue and luminance of the foreground picture are discriminated with reference to a predetermined area on a three-dimensional color space formed around the center color, and a key signal is generated on the basis of the result of discrimination.

Figure 3A:
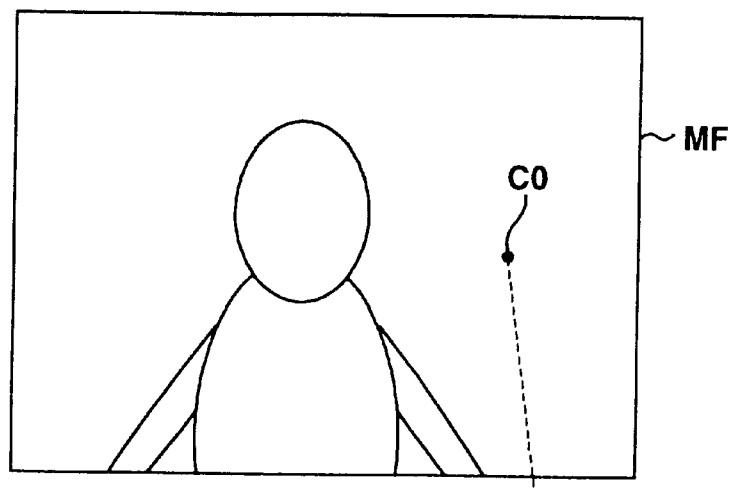
FIGS. 3A and 3B show the relations between a foreground picture and a center color.
Figure 3B:
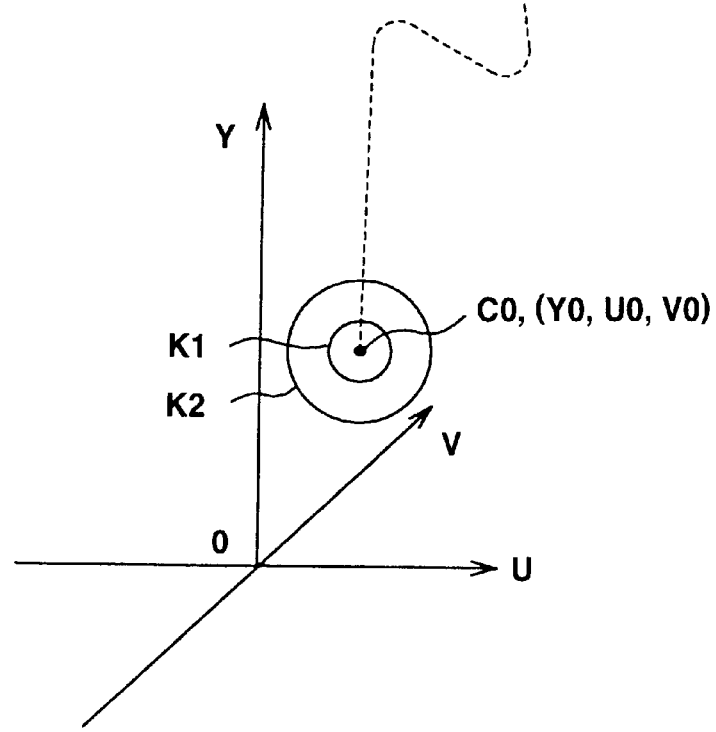

When the operator designates a pixel C0 on a foreground picture MF as shown in FIG. 3A, the central processing unit 10 detects the luminance Y0 and the hues U0, V0 of this pixel, and sets a color specified by the luminance Y0 and the hues U0, V0 to a center color C0 as shown in FIG. 3B. In addition, the central processing unit 10 sets double spherical shape K1 and K2 centering the center color C0 on a three-dimensional color space with luminance Y and color differences U, V as reference axes. At this point, the central processing unit 10 sets a preset reference value as a radius so as to form the two spherical shapes K1 and K2.

Figure 4:
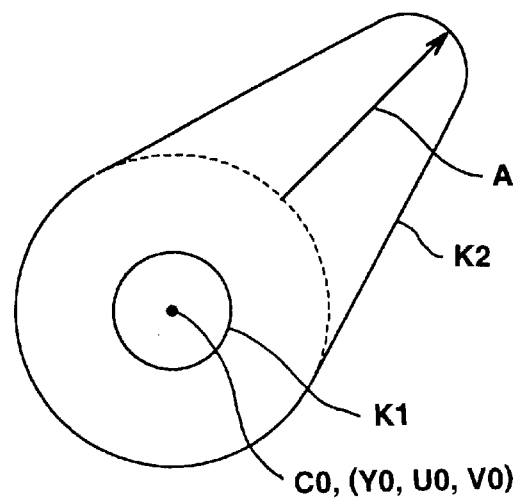
FIG. 4 illustrates setting of conditions of chroma key processing.

Also, the central processing unit 10 carries out processing partly common to chroma key processing as later described, thereby displaying an area of a color included inside of the spheres K1, K2 with respect to the still picture displayed on the monitor 9. In this state, the central processing unit 10 partly transforms the outer spherical shape K2, for example, as indicated by an arrow A in FIG. 4, in response to the operation inputted by the operator through the display on the monitor 9. This transformation is similarly carried out with respect to the inner spherical shape K1 in response to the operation by the operator.

Figure 5A:
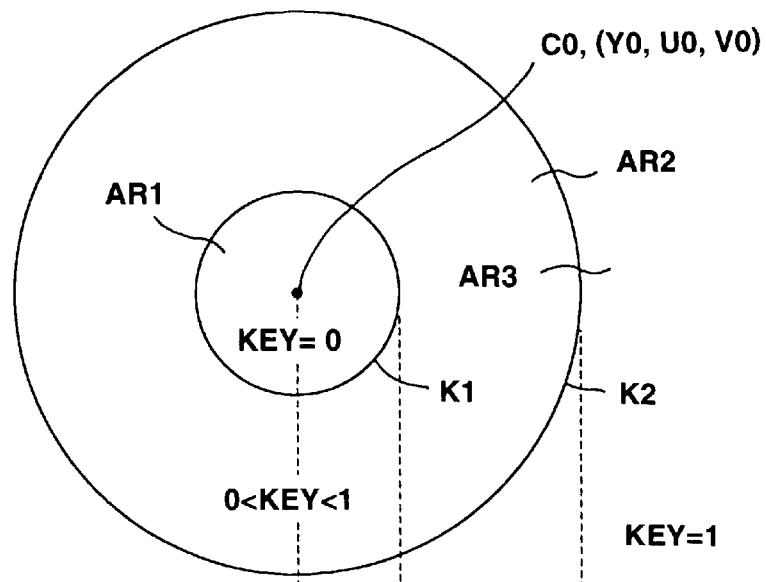
FIGS. 5A and 5B show a boundary and a chroma key signal on a three-dimensional color space of chroma key processing.
Figure 5B:
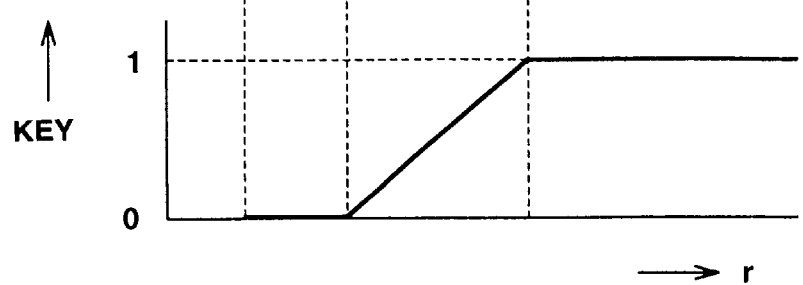

Using the two spherical shapes K1, K2 thus set on the color space, the central processing unit 10 generates a key signal KEY of a value 0 so as to allocate the background with respect to a color included in an inner area AR1 of the spherical shape K1 of a smaller diameter, as shown in FIG. 5A. Also, with respect to a color located in an outer area AR3 of the sphere K2 of a greater diameter, the central processing unit 10 generates a key signal KEY of a value 1 so as to allocate the foreground. In addition, with respect to a color included in an area AR2 between spheres K1 and K2, the central processing unit 10 generates a key signal KEY of a value corresponding to the position of the color within a range of values 1 to 0. FIG. 5B shows an example of the key signal KEY. Thus, the central processing unit 10 sets boundaries K1 and K2 for switching the characteristics of the key signal KEY in accordance with the substantially spherical shapes K1 and K2 set by the operator.

Figure 6:
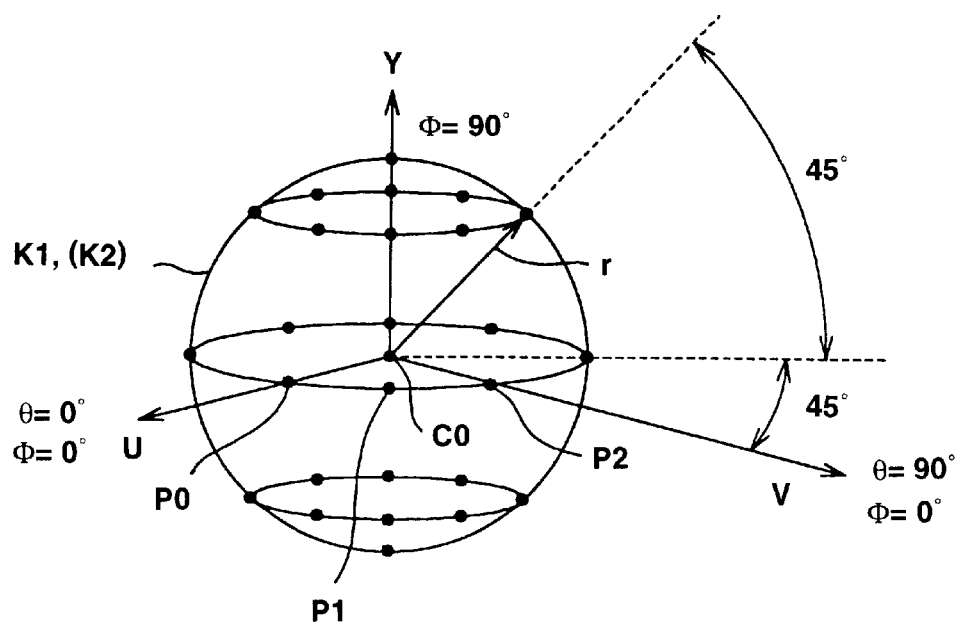
FIG. 6 shows a group of points specifying the boundary on the three-dimensional color space of chroma key processing.

As shown in FIG. 6, the central processing unit 10 expresses the boundaries K1 and K2 thus set, by using 26 points (hereinafter referred to as representative points) P0 to P25, respectively. In addition, the central processing unit 10 expresses the representative points P0 to P25 by coordinate values expressed on a polar coordinate, on a Y, U, V spatial coordinate with the center color C0 as an origin. Specifically, the central processing unit 10 generates a plurality of vectors at conformal 45 degrees in a latitudinal direction (a direction from the center color C0 prescribed by an angle A) and in a longitudinal direction (a direction from the center color C0 prescribed by an angle 6) in the polar coordinate space, and expresses the representative points P0 to P25 by the length r of the vectors. Therefore, in the case where the boundaries K1 and K2 are to be set by the man-machine interface as described above, the central processing unit 10 varies the length r of the corresponding vector in accordance with the operation by the operator. The angle at the time of expressing the representative point is not limited to 45 degrees and may be 22.5 degrees or other arbitrary angles.

Figure 7A:
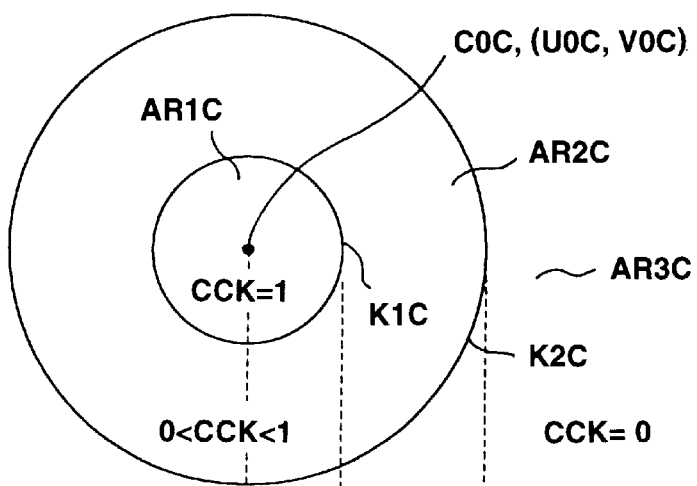
FIGS. 7A and 7B show a boundary and a color cancel key signal on a two-dimensional color space of color cancel processing.
Figure 7B:
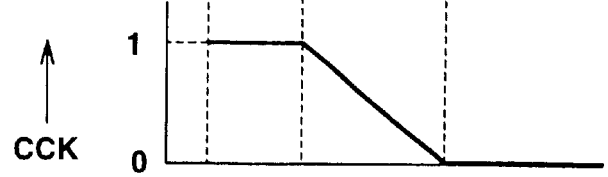

Moreover, the central processing unit 10 cuts the spherical shapes K1, K2 on a plane perpendicular to a Y-axis crossing the center color C0 so as to form double circular shape K1C, K2C as shown in FIG. 7A. The central processing unit 10 transforms the circular shape K1C, K2C in response to the operation by the operator, and displaces the center C0C (U0C, V0C) of the circular shapes K1C, K2C. Thus, the central processing unit 10 sets a range for color cancel by the double circular shapes K1C, K2C, and sets two boundaries for switching characteristics with respect to a color cancel key signal CCK. Specifically, as shown in FIG. 7B, with respect to an area AR1C on the inner side of the circular shape K1C of a smaller diameter, CCK=1 is set so as to carry out color cancel. With respect to an area AR3C on the outer side of the circular shape K2C of a greater diameter, CCK=0 is set so as not to carry out color cancel. With respect to an area AR2C between the circular shape K1C and K2C, a color cancel key signal CCK within a range of values 1 to 0 is generated so as to carry out color cancel corresponding to the position.

Figure 8:
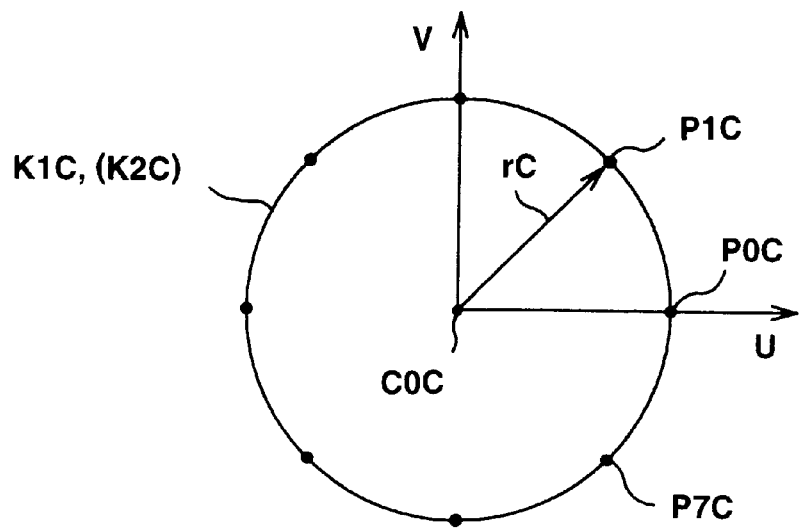
FIG. 8 shows a group of points specifying the boundary on the two-dimensional color space of color cancel processing.

With respect to such range for color cancel, the central processing unit 10 sets vectors at a conformal spacing of 45 degrees as shown in FIG. 8, on the basis of the coordinate (U0C, V0C) of the center C0C changed by the operation by the operator as the origin, and expresses the circular shapes by a group of eight representative points P0C to P7C prescribed by the length of the vectors. This angle may also be set to an arbitrary angle such as 22.5 degrees. Therefore, in the case where the boundaries K1C and K2C of the color cancel range are to be set by the above-described man-machine interface, the central processing unit 10 varies the length rC of the corresponding vector in accordance with the operation by the operator.

The technique of color cancel will now be described. Basically, in chroma key synthesis, the edge of an object or a semi-transparent portion like smoke or a glass is more or less colored with a background color (for example, blue at the time when a blue back is used), and this coloring is prevented by the color cancel function. In this technique, after the same color as the back color in the foreground picture is changed to be colorless, synthesis is carried out.

In principle, color cancel may be carried out by removing the same color as the back color from the foreground picture, that is, adding a complementary color. However, if this processing is carried out on the entire foreground picture, the color of the object is also changed. Therefore, an area where color cancel is to be carried out must be designated. The area is designated by the color cancel signal CCK. This color cancel signal CCK is proximate to a signal obtained by inverting the key signal KEY for chroma key. However, since the method for generating the original key signal differs, the inverted color cancel signal CCK is not perfectly identical to the key signal KEY for chroma key.

When the boundaries K1, K2 for chroma key and the boundaries K1C, K12C for color cancel are thus set in accordance with the operation by the operator, the central processing unit 10 shifts to parameter setting processing. The central processing unit 10 calculates a parameter to be set to the chroma key processing section 5, and then sets this parameter to the chroma key processing section 5.

Figure 9:
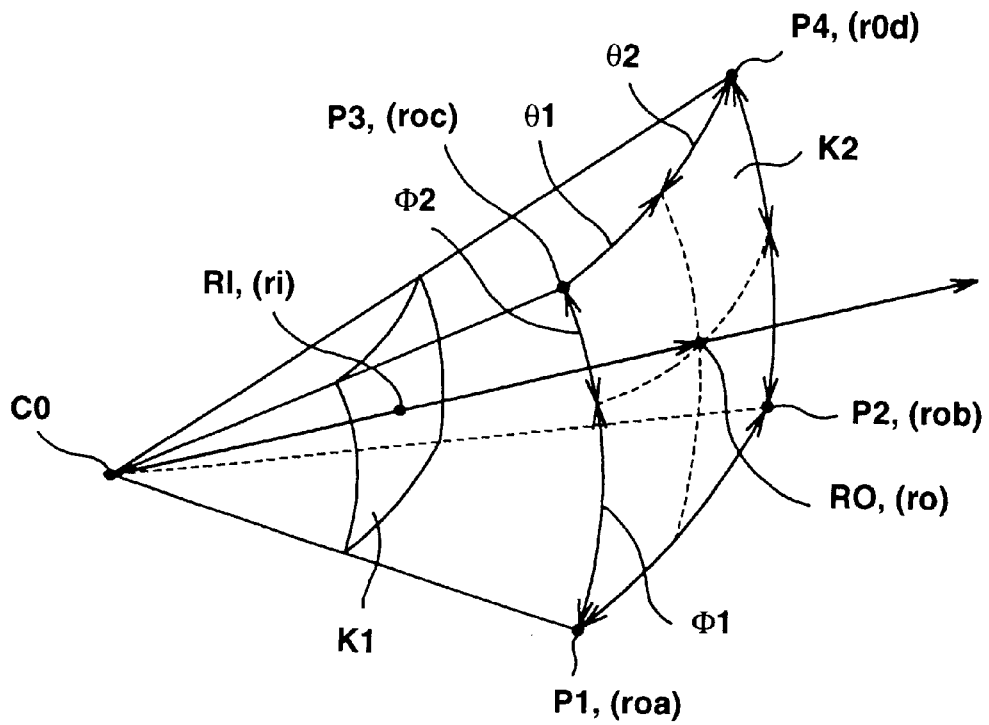
FIG. 9 illustrates calculation of the distance from the group of points of FIG. 6 to a boundary of a greater diameter.
Figure 10:
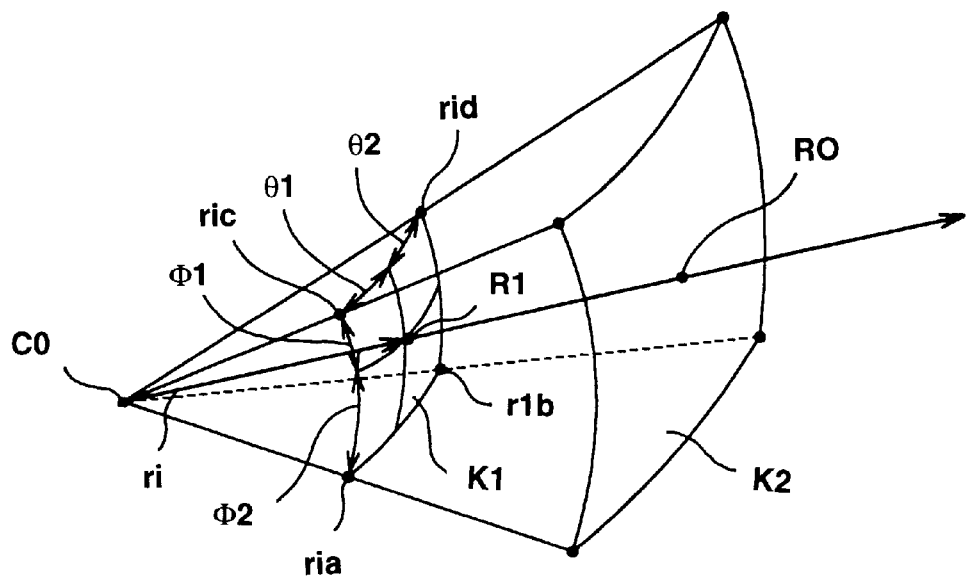
FIG. 10 illustrates calculation of the distance from the group of points of FIG. 6 to a boundary of a smaller diameter.

In calculation of this parameter, the central processing unit 10 calculates a parameter of chroma key processing by the boundaries K1, K2. Specifically, as shown in FIGS. 9 and 10, the central processing unit 10 sequentially changes the latitude φ and the longitude θ on the Y, U, V color space based on the center color CO described above in FIG. 6, and calculates the lengths ri and ro to points RI and RO where a vector V extending from the origin crosses the boundaries K1 and K2, respectively, in each latitude φ and longitude θ.

At this point, the central processing unit 10 sequentially calculates the lengths ri and ro by interpolation processing of the following Equations (1) and (2) using the coordinate of adjacent four representative points with respect to each of the boundaries K1 and K2.

$$ro(\phi, \theta) = \frac{SO}{(\theta 1 + \theta 2) \cdot (\phi 1 + \phi 2)} \quad (1)$$

SO=roa·θ2·φ2+rob·θ1·φ2+roc·θ2·100 1+rod·θ1·φ1

$$ri(\phi, \theta) = \frac{SI}{(\theta 1 + \theta 2) \cdot (\phi 1 + \phi 2)} \quad (2)$$

SI=ria·θ2·φ2+rib·θ1·φ2+ric·θ2·φ1+rid·θ1·φ1

Figure 11A:
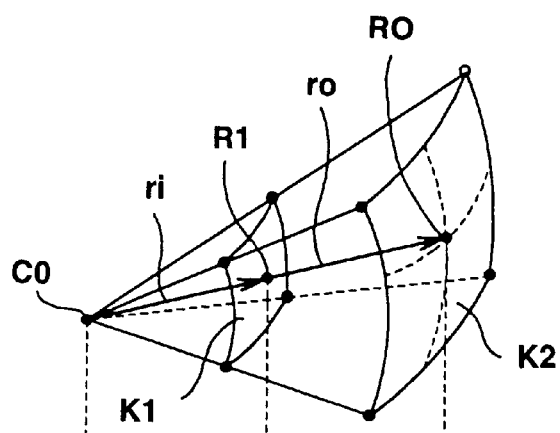
FIGS. 11A and 11B show the relations between the boundary of FIG. 5 and characteristics of chroma key processing.
Figure 11B:
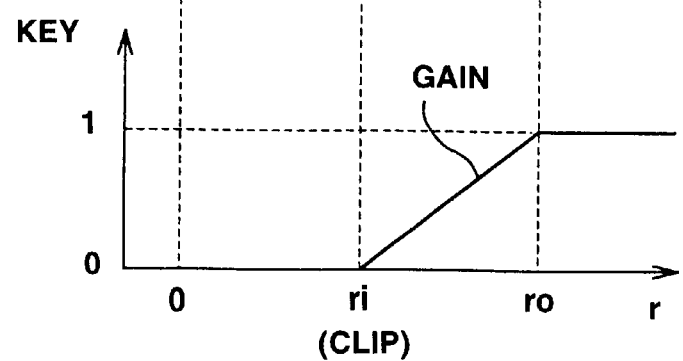

In addition, the central processing unit 10 calculates a clip point CLIP and a gain GAIN from the lengths ri and ro to the points RI and RO thus detected with respect to the latitude φ and the longitude θ, as shown in FIGS. 11A and 11B. The central processing unit 10 sets the length ri calculated from the boundary K1 of the smaller diameter to the clip point CLIP. The central processing unit 10 sets the clip point CLIP to a value 0, and sets the position of the length ro calculated from the boundary K2 of the greater diameter to a value 1. The central processing unit 10 then sets the slope of a straight line connecting the clip point CLIP and the point of the value 1 to the gain GAIN.

That is, the central processing unit 10 carries out processing of the following equations so as to calculate the clip point CLIP and the gain GAIN for every latitude φ and longitude θ.

$$CLIP(\phi, \theta) = ri(\phi, \theta) \quad (3)$$

$$GAIN(\phi, \theta) = \frac{1.0}{ro(\phi, \theta) - ri(\phi, \theta)} \quad (4)$$

Thus, the central processing unit 10 sets a characteristic curve of key signal generation in accordance with the clip point CLIP and the gain GAIN for every latitude φ and longitude θ. This characteristic curve is held at the value 0 up to the boundary K1 of the smaller diameter, and is expressed by connecting the value 0 to the value 1 between the boundary K1 of the smaller diameter and the boundary K2 of the greater diameter, in accordance with the distance r from the center color CO with respect to each latitude φ and longitude θ.

Having thus calculated the clip point CLIP and gain GAIN, the central processing unit 10 sets the clip point CLIP and the gain GAIN to a key signal generating section 6, and forms a look-up table of the clip point CLIP and the gain GAIN using each latitude φ and longitude θ as an address, in the key signal generating section 6.

Similarly, the central processing unit 10 calculates a clip point and a gain for every latitude with respect to the range for color cancel. In addition, the central processing unit 10 sets the calculated clip point and gain to the key signal generating section 6, and forms a look-up table of the clip point and the gain using each longitude θ as an address, in the key signal generating section 6.

Having thus formed the look-up table in the key signal generating section 6, the central processing unit 10 completes the parameter setting processing.

Figure 12:
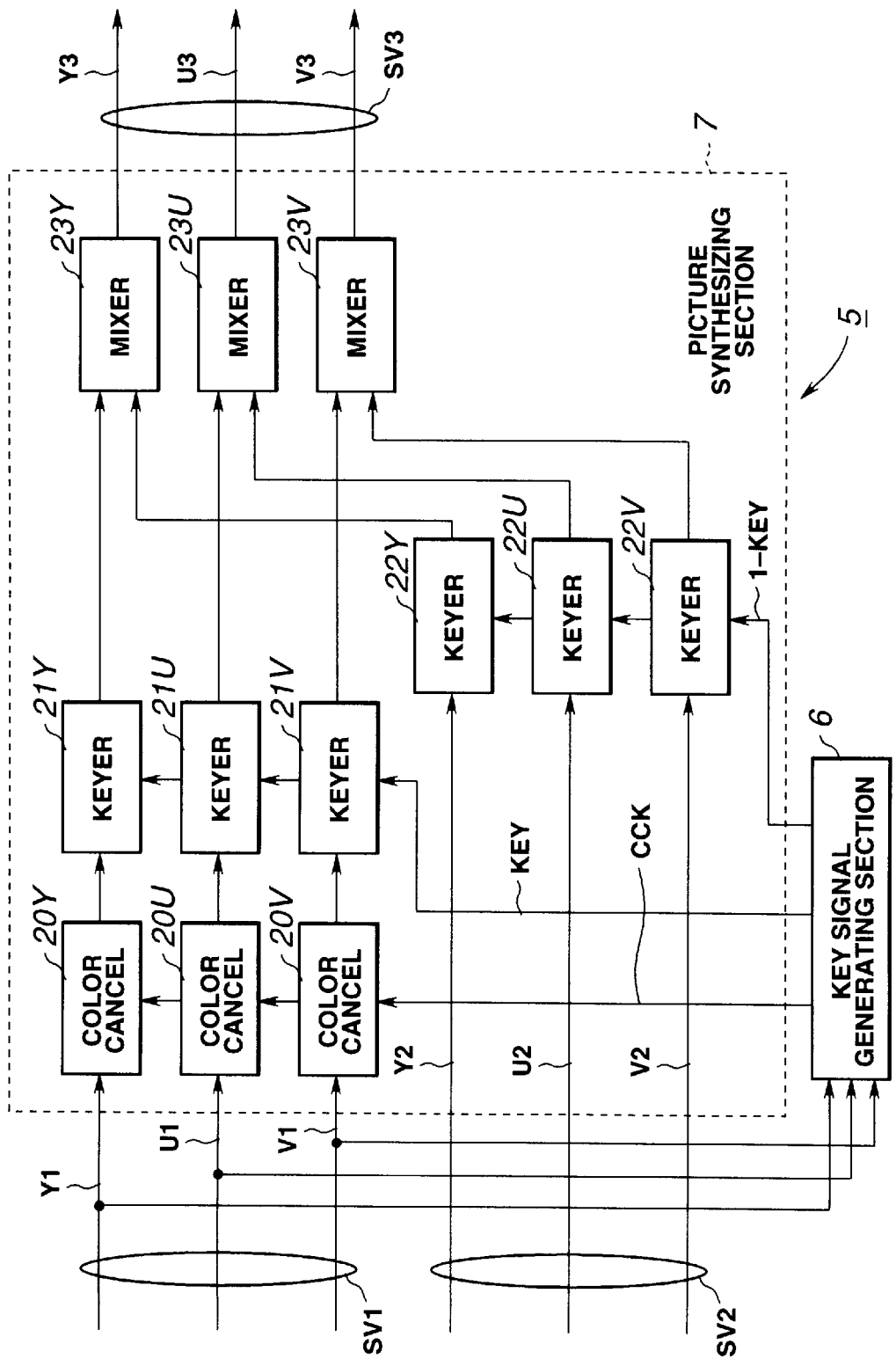
FIG. 12 is a block diagram showing a chroma key processing section of the editing device of FIG. 1.

FIG. 12 is a block diagram showing, the picture synthesizing section 7. The picture synthesizing section 7 inputs a luminance signal Y1 and color-difference signals U1, V1 constituting the image signal SV1, and a luminance signal Y2 and color-difference signals U2, V2 constituting the image signal SV2, in the form of digital signals. Color cancel circuits 20Y, 20U, 20V receive the luminance signal Y and the color-difference signals U1, V1 of the image signal of the foreground picture, respectively, and carry out color cancel processing as described above on the luminance signal Y and the color-difference signals U1, V1 by the color cancel key signal CCK so as to output the color-cancelled signals.

The color cancel key signal CCK is generated by the key signal generating section 6 with reference to the above-described color cancel range. Thus, the color cancel circuits 20Y, 20U, 20V carry out color cancel processing on a contour portion which is left by chroma key processing, so as to effectively prevent reflection of the background onto the foreground picture.

Keyers 21Y, 21U, 21V carry out weighting by a key signal KEY on the luminance signal Y1 and the color-difference signals U1, V1 outputted from the color cancel circuits 20Y, 20U, 20V, so as to output the weighted signals. Keyers 22Y, 22U, 22V receive the luminance signal Y2 and the color-difference signals U2, V2 of the image signal of the background picture, and carry out weighting by a key signal 1−KEY on the luminance signal Y2 and the color-difference signals U2, V2 so as to output the weighted signals. The key signal 1−KEY inputted to the keyers 22Y, 22U, 22V is generated by the key signal generating section 6 with reference to the key signal KEY so that the key signal 1−KEY added to the key signal KEY inputted to the keyers 21Y, 21U, 21V forms a weighting value of 1.

Mixers 23Y, 23U, 23V adds the luminance signal Y1 and the color-difference signals U1, VI outputted from the keyers 21Y, 21U, 21V to the luminance signal Y2 and the color-difference signals U2, V2 outputted from the keyers 22Y, 22U, 22V, and output an image signal SV3 by a luminance signal Y3 and color-difference signals U3, V3.

Thus, the picture synthesizing section 7 synthesizes the foreground and the background picture by the key signals KEY and 1KEY, and at the same time, reduces reflection of the background onto the foreground picture by the key signal CCK.

Referring to FIG. 2, a key signal generating device as a first embodiment of the present invention will now be described.

FIG. 2 is a block diagram showing the key signal generating device, which is the first embodiment of the present invention, as an example of the key signal generating section 6 of FIG. 1. In the key signal generating section 6, a chroma key signal generating section 25 inputs color-difference signals U1, V1 to over-sampling circuits 26U, 26V, respectively, so as to over-sample the color-difference signals U1, V1 by the same sampling frequency as for a luminance signal Y. Thus, the chroma key signal generating section 25 effectively prevents generation of noise in the subsequent processing of the color-difference signal U1, V1.

A coordinate transformation circuit 27 receives the color-difference signals U1, V1, and specifies each pixel of the image signal SV1 of the color-difference signals U1, V1 by polar coordinate on a UV plane with the center color CO as the origin. That is, the coordinate transformation circuit 27 subtracts color-difference signal levels U0, V0 of the center color CO from the color-difference signal levels U1, V1, respectively. From the result of subtraction, the coordinate transformation circuit 27 calculates an angle θ on the UV plane and a distance rm from the origin CO.

Figure 13:
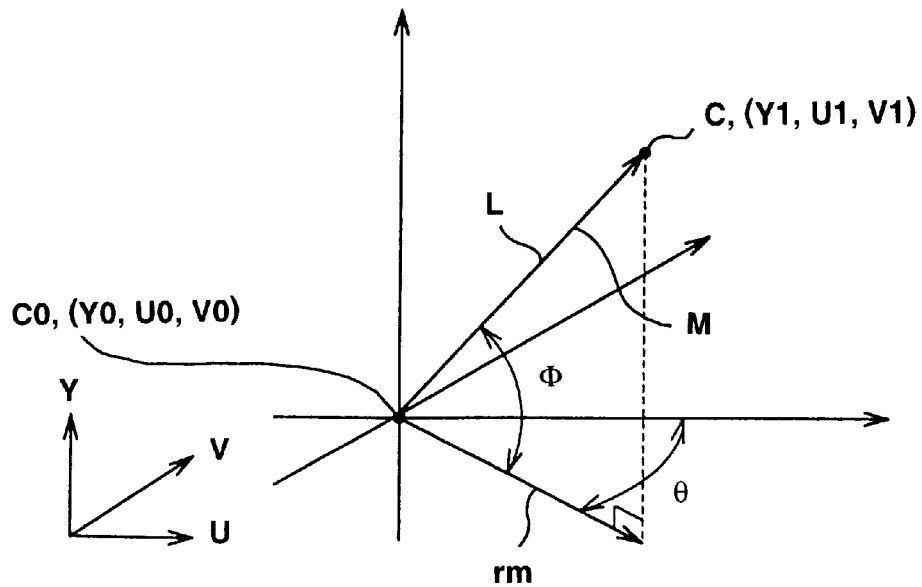
FIG. 13 illustrates processing of a foreground picture.

The coordinate transformation circuit 27 carries out arithmetic processing of the following equations, thereby detecting the length rm of a line formed by projecting onto the UV plane a line L connecting the position of each pixel of the image signal SV1 on a YUV space with the center color CO as the origin and the origin CO, and the longitude θ of the line L on the YUV space, as shown in FIG. 13.

$$\theta = \arctan\frac{V1 - V0}{U1 - U0} \quad (5)$$

$$rm = ((U1-U0)^2 + (V1-V0)^2)^{1/2} \quad (6)$$

A coordinate transformation circuit 28 carries out arithmetic processing of the following equations from the distance rm calculated by the coordinate transformation circuit 27 and the luminance signal level Y1, thereby calculating the latitude φ and the distance rM to the origin CO with respect to the position of each pixel of the image signal SV1 on the YUV space with the center color CO as the origin.

$$\phi = \arctan\frac{Y1 - Y0}{rm} \quad (7)$$

$$rM = ((Y1-Y0)^2 + rm^2)^{1/2} \quad (8)$$

A look-up table 29 is formed by storing a clip point CLIP(x, y) and a gain GAIN(x, y) at each latitude x and longitude y calculated by the central processing unit 10 in advance. The look-up table 29 outputs corresponding clip point CLIP(φ, θ) and gain GAIN(φ, θ) using the longitude θ and the latitude φ calculated by the coordinate transformation circuits 27, 28. Thus, the look-up table 29 selectively outputs a characteristic corresponding to each pixel of the image signal SV1, that is, a characteristic shown in FIG. 11B, from the characteristics of each latitude 4 and longitude θ calculated in advance by the central processing unit 10.

A key process circuit 30 generates a key signal MXK corresponding to the distance rM calculated by the coordinate transformation circuit 28, on the basis of the clip point CLIP and the gain GAIN outputted from the look-up table 29. Specifically, the key process circuit 30 outputs the key signal MXK of a value 0 if the distance rM is shorter than the clip point CLIP, that is, if the pixel of the image signal SV is located on the inner side of the boundary K1 of the smaller diameter as indicated by A in FIG. 14, as expressed by the following equation.

$$MXK=0(rM<CLIP) \quad (9)$$

On the other hand, if the distance rM is longer than the clip point CLIP, the key process circuit 30 carries out arithmetic processing of the following Equation (10) and clips the result of this arithmetic processing to a value 1 for output.

Figure 14:
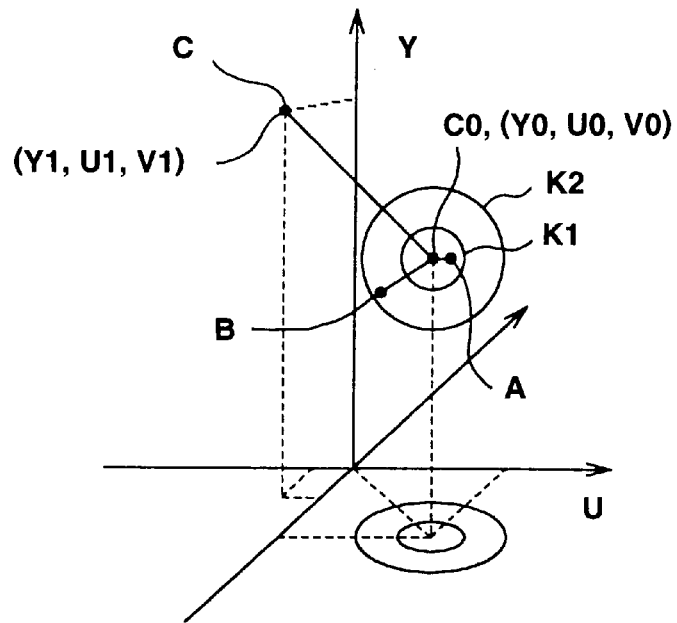
FIG. 14 illustrates a boundary on the three-dimensional color space of chroma key processing.

The key process circuit 30 carries out arithmetic processing of the following equations so as to generate the key signal MXK, depending upon the case where the pixel of the image signal SV1 is located between the boundary K1 of the smaller diameter and the boundary K2 of the greater diameter (indicated by B in FIG. 14) or the case where the pixel is located on the outside of the boundary K2 of the greater diameter (indicated by C in FIG. 14).

$$MXK=(rM-CLIP)\times GAIN(CLIP<rM<ro) \quad (10)$$

$$MXK=1(ro<rM) \quad (11)$$

Thus, the key process circuit 30 in the chroma key signal generating section 25 generated the key signal MXK of chroma key with reference to the luminance signal Y1 and the color-difference signals U1, V1 of the image signal SV1 by using the preset look-up table 29.

Generation of the key signal for color cancel will now be described.

The key signal generating section 6 generates a key signal AMK for the above-described color cancel, and inverts (subtracts from 1) this key signal to provide a color cancel key signal CCK. The key signal generating section 6 also corrects the signal level of the key signal MXK for chroma key by the key signal AMK to provide a chroma key signal KEY. The picture synthesizing section 7 carries out color cancel processing using the color cancel signal CCK obtained by inverting (subtracting from 1) the key signal AMK, and carries out chroma key processing using the corrected chroma key signal KEY, thereby carrying out picture synthesis in which the above-described reflection of the background color onto the contour portion of the object is reduced.

Specifically, in the key signal generating section 6, a color cancel key signal generating section 32 inputs the color-difference signals U1, V1 outputted from the over-sampling circuits 26U, 26V to a coordinate transformation circuit 33. The coordinate transformation circuit 33 detects the position of each pixel of the image signal SV1 on a UV plane with the center coordinate U0C, V0C used for the above-described generation of the color cancel parameter. In this detection processing, the same arithmetic processing as the arithmetic processing of Equations (5) and (6) is carried out to calculate a distance rC and an angle θC.

A look-up table 34 is formed by storing a clip point CLIPC(x) and a gain GAINC(x) at each angle x calculated by the central processing unit 10 in advance. The look-up table 34 outputs corresponding clip point CLIPC(φC) and gain GAINC(φC) using the angle θC calculated by the coordinate transformation circuit 33. Thus, the look-up table 34 selectively outputs a characteristic corresponding to each pixel of the image signal SV1 from the characteristics of each angle θC calculated in advance by the central processing unit 10.

Figure 15A:
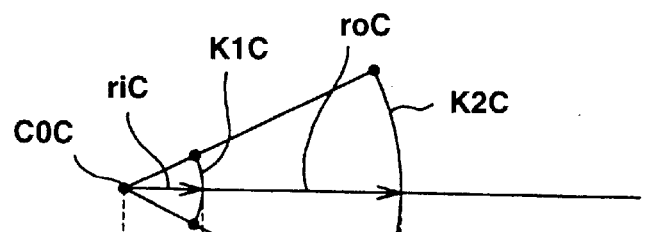
FIGS. 15A and 15B show the relations between a boundary on the two-dimensional color space of color cancel processing and a key signal for color cancel.
Figure 15B:
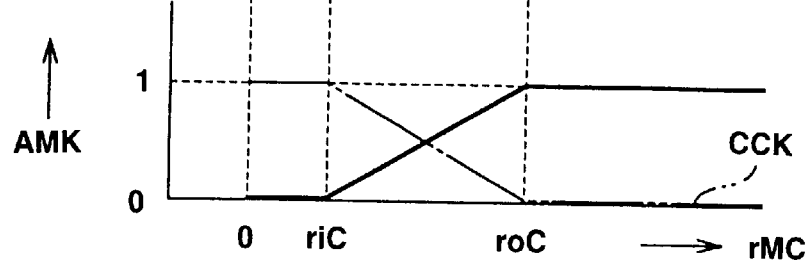

FIGS. 15A and 15B show the relations between the lengths riC, roC to the double circular shapes K1C, K2C of FIGS. 7A and 7B and the key signal AMK. On the assumption that the length riC from the center COC as a reference color of color cancel to the boundary K1C of the smaller circular shape is the clip point CLIPC, the key signal AMK corresponding to the distance rMC to the center COC with respect to the position of each pixel of the image signal on the UV space is expressed by the following Equations (12) to (14).

$$AMK = 0 \, (rMC < CLIPC) \tag{12}$$

$$AMK = (rMC - CLIPC) \times GAINC \, (CLIPC < rMC < roC) \tag{13}$$

$$AIMK = 1 \, (roC < rMC) \tag{14}$$

A key process circuit 35 generates a key signal AMK corresponding to the distance rC calculated by the coordinate transformation circuit 33, on the basis of the clip point CLIPC(θC) and the gain GAINC(θC) outputted from the look-up table 34, similarly to the key process circuit 30. An inversion circuit 36 subtracts this key signal AMK from a value 1 so as to output a color cancel signal CCK. Thus, the color cancel key signal generating section 32 generates the key signal AMK corresponding to a two-dimensional area set for color cancel by the operator.

In the chroma key signal generating section 25, a subtraction circuit 37 subtracts, from a value 1, a key signal KEY for chroma key outputted from a selection circuit 38 so as to output a key signal 1−KEY for background. The selecting circuit 38 generates the key signal KEY for chroma key from the key signals MXK, AMK outputted from the key process circuits 30, 35. At this point, the selection circuit 38 switches the operation interlocked with the color cancel key signal generating section 32 in response to the operation by the operator, thereby carrying out chroma key processing desired by the user.

In the case where the image signal SV3 outputted from the mixers 23Y, 23U, 23V of FIG. 12 is expressed by the luminance signal Y and the color-difference signals U, V and where the operator does not select color cancel processing, the selection circuit 38 outputs the key signal MXK outputted from the key process circuit 30, as the key signal KEY for chroma key, and the color cancel key signal generating section 32 outputs the key signal CCK of a value 1. Thus, the chroma key processing section 5 carries out chroma key processing expressed by the following relational expression.

$$\begin{bmatrix} Y3 \\ U3 \\ V3 \end{bmatrix} = MXK \cdot \begin{bmatrix} Y1 \\ U1 \\ V1 \end{bmatrix} + (1 - MXK) \cdot \begin{bmatrix} Y2 \\ U2 \\ V2 \end{bmatrix} \tag{15}$$

In the case where the operator selects color cancel processing in a first operation mode, the selection circuit 38 outputs the key signal MXK outputted from the key processing circuit 30, as the key signal KEY for chroma key, and the color cancel key signal generating section 32 outputs the key signal 1−AMK (=CCK) generated by the above-described arithmetic processing, only with respect to the color-difference signals. Thus, the chroma key processing section 5 carries out chroma key processing expressed by the following relational expression.

$$\begin{bmatrix} Y3 \\ U3 \\ V3 \end{bmatrix} = MXK \cdot \begin{bmatrix} Y1 \\ U1 - CCK \cdot U0C \\ V1 - CCK \cdot V0C \end{bmatrix} + (1 - MXK) \cdot \begin{bmatrix} Y2 \\ U2 \\ V2 \end{bmatrix} \tag{16}$$

In this relational expression, U0C, V0C represent reference colors for color cancel preset by the operator.

In this processing of the first operation mode, color-difference signal components U0C, V0C of the color of the center C0C of color cancel are subtracted from the color-difference signal components U1, V1, that is, complementary colors are added in order to prevent the edge of the object or a semi-transparent portion like smoke or a glass from becoming bluish (in the case of blue back). Thus, the same color as the background color (blue in the case of blue back) in the foreground picture is changed to be colorless. However, if this color cancel processing is carried out on the entire foreground picture, the color of the object is also changed. Therefore, an area where color cancel is to be carried out must be designated. The color cancel key signal CCK is a signal for carrying out such designation.

In the case where the operator selects color cancel processing in a second operation mode, the selection circuit 38 outputs the key signal AMK for color cancel as the key signal KEY, and the color cancel key signal generating section 32 outputs the key signal 1−AMK (=CCK) generated by the above-described arithmetic processing. Thus, the chroma key processing section 5 carries out chroma key processing expressed by the following relation expression.

$$\begin{bmatrix} Y3 \\ U3 \\ V3 \end{bmatrix} = \begin{bmatrix} Y1 \\ U1 \\ V1 \end{bmatrix} - CCK \cdot \begin{bmatrix} Y0C \\ U0C \\ V0C \end{bmatrix} + (1 - MXK) \cdot \begin{bmatrix} Y2 \\ U2 \\ V2 \end{bmatrix} \tag{17}$$

In this relational expression, Y0C represents the luminance level of a reference color for color cancel preset by the operator. Such switching of the operation of the color cancel key signal generating section 32 is carried out by switching the operation of the inversion circuit 36.

This second operation mode is referred to as an add-mix synthesis mode. In this synthesis, keying processing on the foreground picture is not carried out. That is, with respect to the foreground picture, color cancel is carried out only in a portion where the color is to be cancelled, and the background picture on which keying processing has been carried out is added so as to carry out synthesis. This processing is effective in the case where the operator wishes to carry out color cancel while leaving all the information including the shadow of the object or other noise generated on the blue back of the foreground picture.

FIGS. 16A to 16F illustrate such processing in the second operation mode (add-mix synthesis mode).

FIG. 16A shows an example of a foreground picture in which an object SB such as a person is located in front of a blue back BB as a background, with a bright portion BR and a shadow portion SH generated near the object SB. FIG. 16B shows a luminance signal Y1 on a predetermined horizontal line g of an image signal of this foreground picture. FIG. 16C shows the key signal MXK. With respect to the image signal keyed by this key signal MXK, for example, the luminance signal, all the information including the shadow portion SH and the bright portion BR on the blue back BB is cancelled, and only the information of the object SB remains, as shown in FIG. 16D. The color cancel key signal CCK is a signal which is narrower on the side of the object area than the signal obtained by inverting (subtracting from 1) the key signal MXK, as shown in FIG. 16E. FIG. 16F shows a signal (luminance signal component of the image signal) obtained by calculating Y1−CCK·Y0C for the above-described add-mix synthesis. The same can be applied to the color-difference signal components. As shown in FIG. 16F, synthesis is carried out with the noise and the bright portion BR on the blue back remaining.

Condition setting for chroma key processing will now be described.

Figure 17:
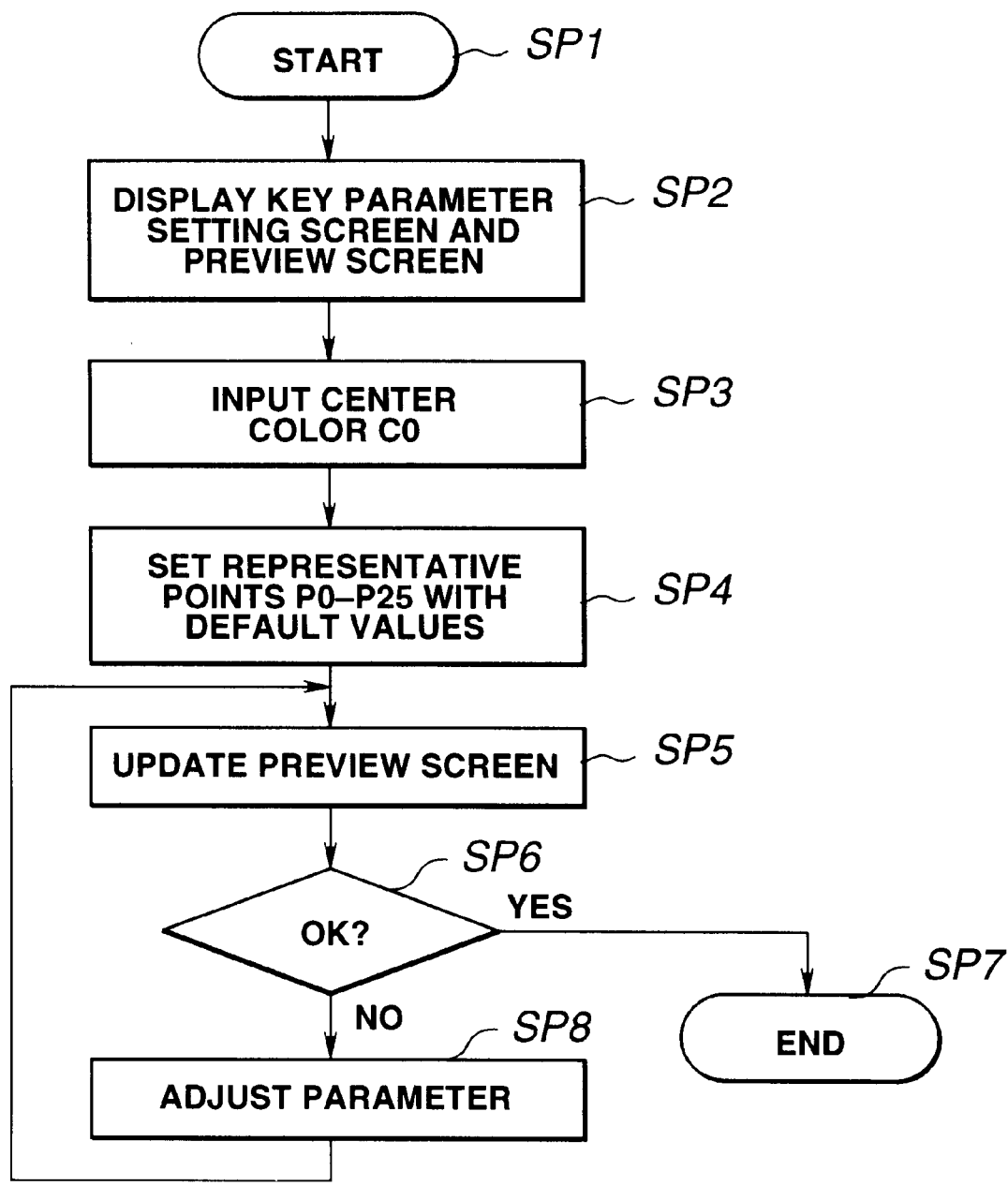
FIG. 17 is a flowchart showing procedures for setting chroma key processing conditions.

FIG. 17 is a flowchart showing the processing procedures of the central processing unit 10 at the time of setting conditions for chroma key processing, which is carried out in the above-described manner. The central processing unit 10 displays a key parameter setting screen and a preview screen on the monitor 9, and accepts conditions for chroma key processing in response to the operation carried out by the operator through these screens. The key parameter setting screen is a screen for condition setting for chroma key processing, and the preview screen is a screen for confirmation of chroma key processing using a still picture. The central processing unit 10 carries out events registered on the key parameter setting screen and the preview screen themselves in response to the operation by the operator, or carries out events registered on buttons in these screens in response to the operation by the operator, thereby carrying out processing which will now be described.

That is, when the operator designates an editing target and selects chroma key processing in a predetermined menu screen, the central processing unit 10 shifts from step SP1 to step SP2 and controls the entire operation to display the key parameter setting screen and the preview screen on the monitor 9.

Then, the central processing unit 10 shifts to step SP3 so as to accept input of the center color CO (FIG. 6), and at the subsequent step SP4, sets the representative points P0 to P25 (FIG. 6) with default values with reference to the center color CO. Then, the central processing unit 10 shifts to step SP5 so as to update the preview screen by using the center color CO and the representative points P0 to P25. At the subsequent step SP6, when the operator operates an operating element of completion of parameter setting, the central processing unit 10 shifts to step SP7 to end this processing procedure. Thus, the central processing unit 10 subsequently sets the look-up tables 29, 34, if necessary.

On the other hand, in the case where the operator who has confirmed the preview screen operates the key parameter setting screen, since the result of chroma key processing desired by the operator is not obtained, the central processing unit 10 shifts from step SP6 to step SP8 so as to accept operation by the operator through the key parameter setting screen. Thus, the central processing unit 10 accepts updating of the center color CO and the representative points P0 to P25 so as to adjust the parameter of chroma key processing, and then returns to step SP5 to update the preview screen.

Figure 18:
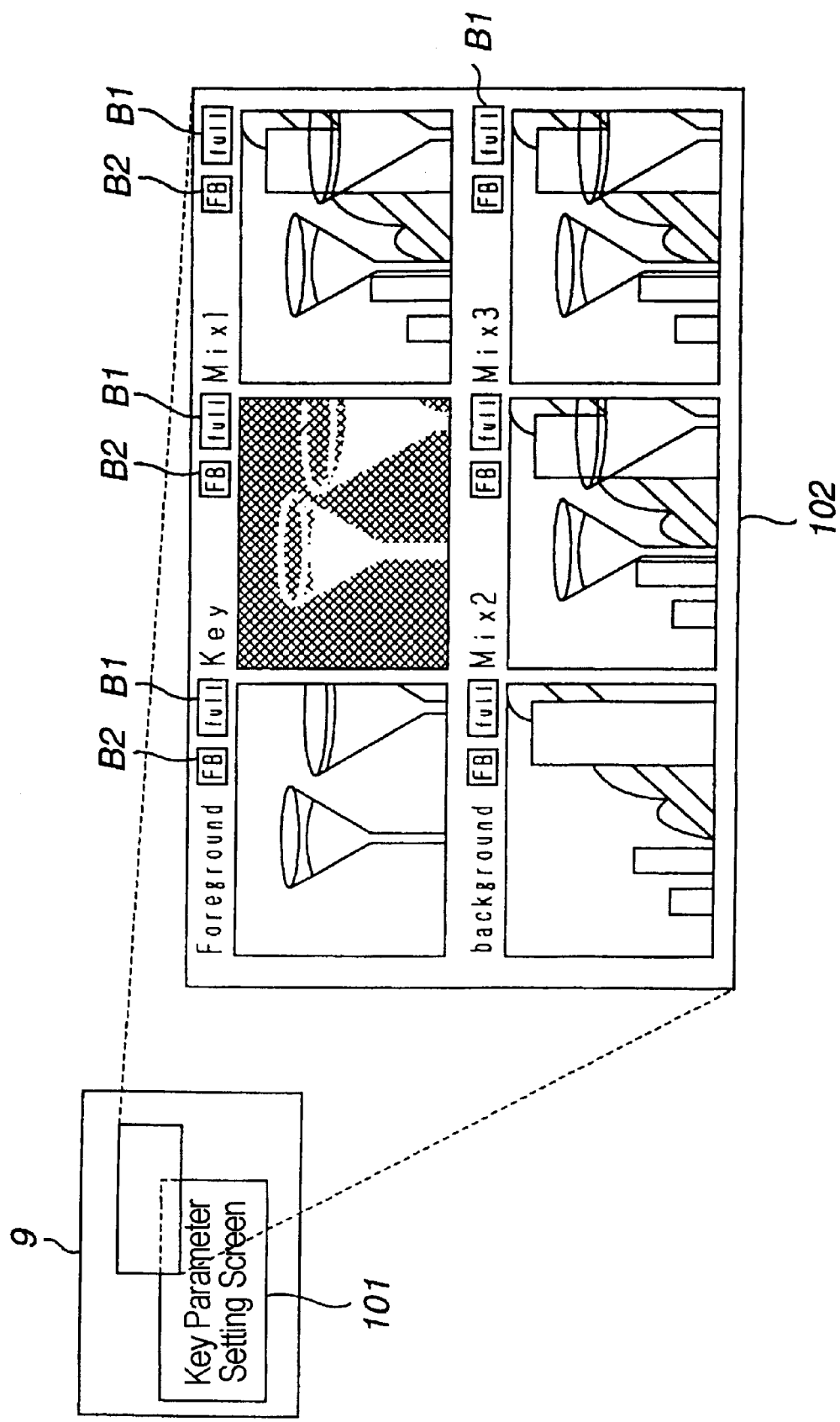
FIG. 18 shows a preview screen in the editing device of the first embodiment of the present invention.

FIG. 18 is a schematic view showing this preview screen 102.

This preview screen 102 is constituted by a foreground picture (Foreground), a background picture (Background), a key signal picture (Key), and first to third synthetic pictures (Mix1 to Mix3). To the foreground picture (Foreground), one frame of still picture selected by the operator from an editing target material designated by an IN-point and an OUT-point is allocated. To the background picture (Background), one frame of still picture selected by the operator from an editing material for the background is similarly allocated. On the other hand, the key signal picture (Key) is formed by displaying a key signal generated by the set center color CO and representative points P0 to P25. To the first to third synthetic pictures (Mix1 to Mix3), still pictures formed by arithmetic processing of Equations (15), (16) and (17) using the generated key signal are allocated.

The central processing unit 10 of FIG. 1 loads the corresponding foreground picture and background picture to the frame buffers 3, 4 by the hard disk drive 2, and carries out processing at the key signal generating section 6 and the picture synthesizing section 7 by arithmetic processing, thereby generating and displaying the key signal pictures. The central processing unit 10 forms the preview screen so that the processing result may be confirmed at an appropriate timing in changing the setting of the center color CO and the representative points P0 to P25. Thus, the easiness in handling is improved. Also, the central processing unit 10 forms the preview screen 102 so that the processing results of three types of chroma key processing allocated to the editing device 1 may be compared and confirmed. Thus, the easiness in handling for the operator is improved.

In the preview screen 102, a display showing the name of each picture is arranged at an upper left part of each picture. At an upper right part of each picture, a button (full) B1 for enlarged display of each picture on the entire display screen and a button (FB) B2 for displaying the picture on a dedicated monitor unit are arranged. When these buttons B1, B2 are clicked by using the mouse 13, the central processing unit 10 carries out events registered on the buttons B1, B2, thereby carrying out enlarged display of each picture and displaying the still picture on the dedicated monitor.

Figure 19:
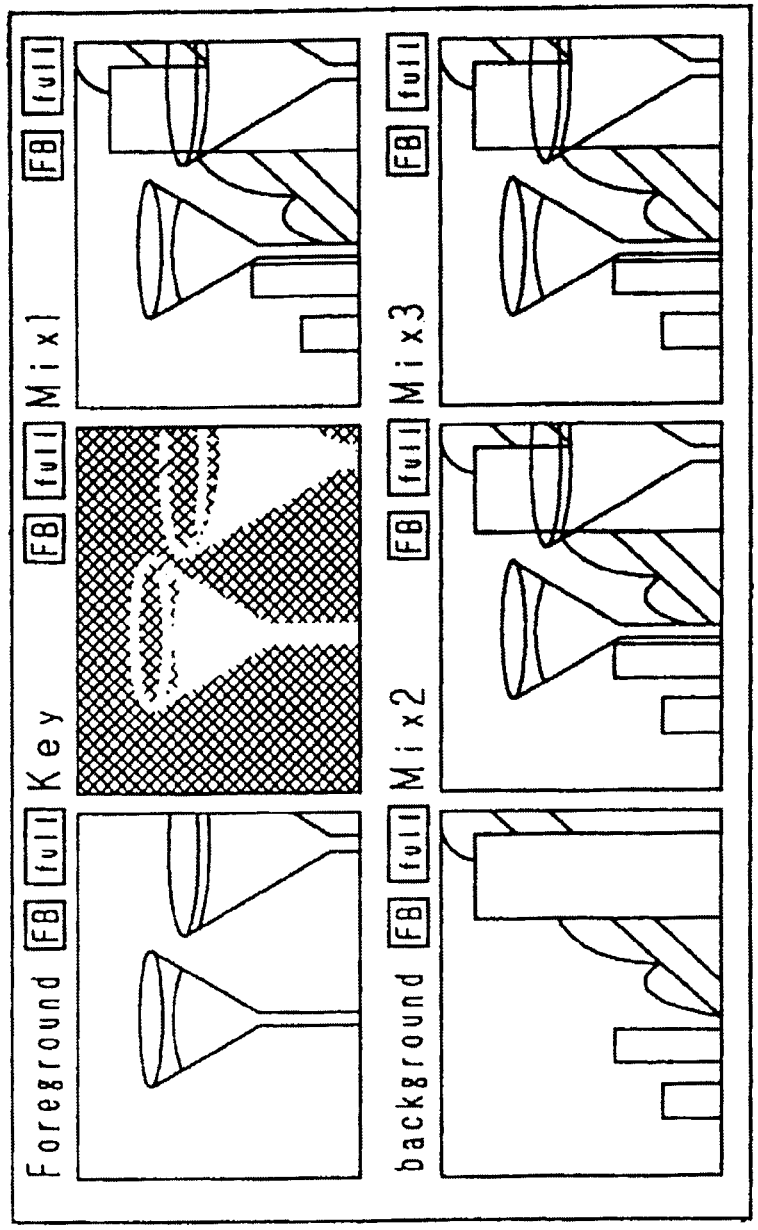
FIG. 19 shows a specific example of the preview screen.

FIG. 19 shows a specific example of the preview screen as described above.

Figure 20:
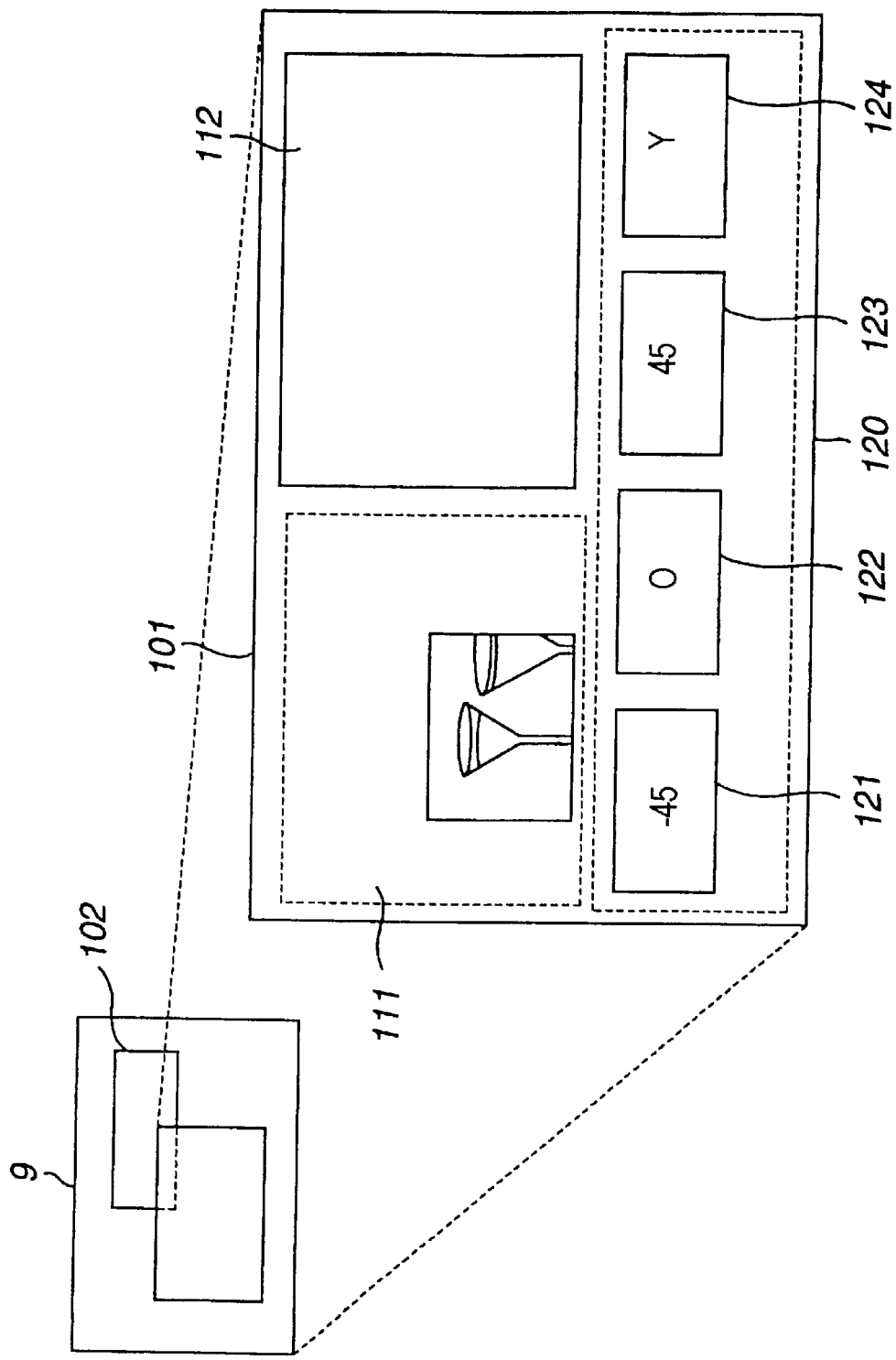
FIG. 20 illustrates a key parameter setting screen.

FIG. 20 is a schematic view showing the key parameter setting screen 101. This key parameter setting screen 101 is constituted by a center color setting section 111, a color space display section 112, and a vector scope display section 120 so that the setting of the center color CO and the representative points P0 to P25 may be changed by operating each display section.

Figure 21:
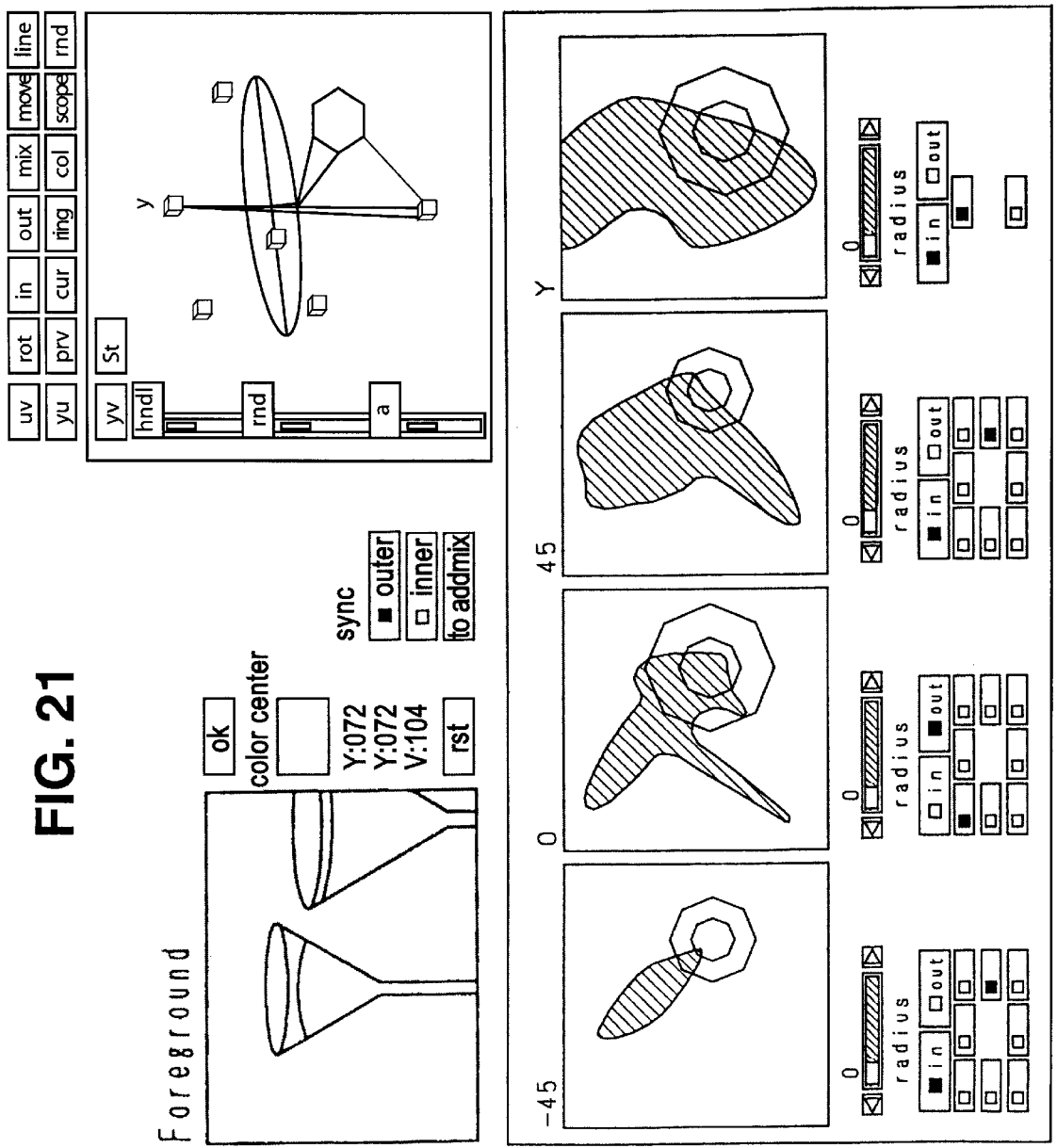
FIG. 21 shows a specific example of the key parameter setting screen.

FIG. 21 shows a specific example of the key parameter setting screen.

Figure 22:
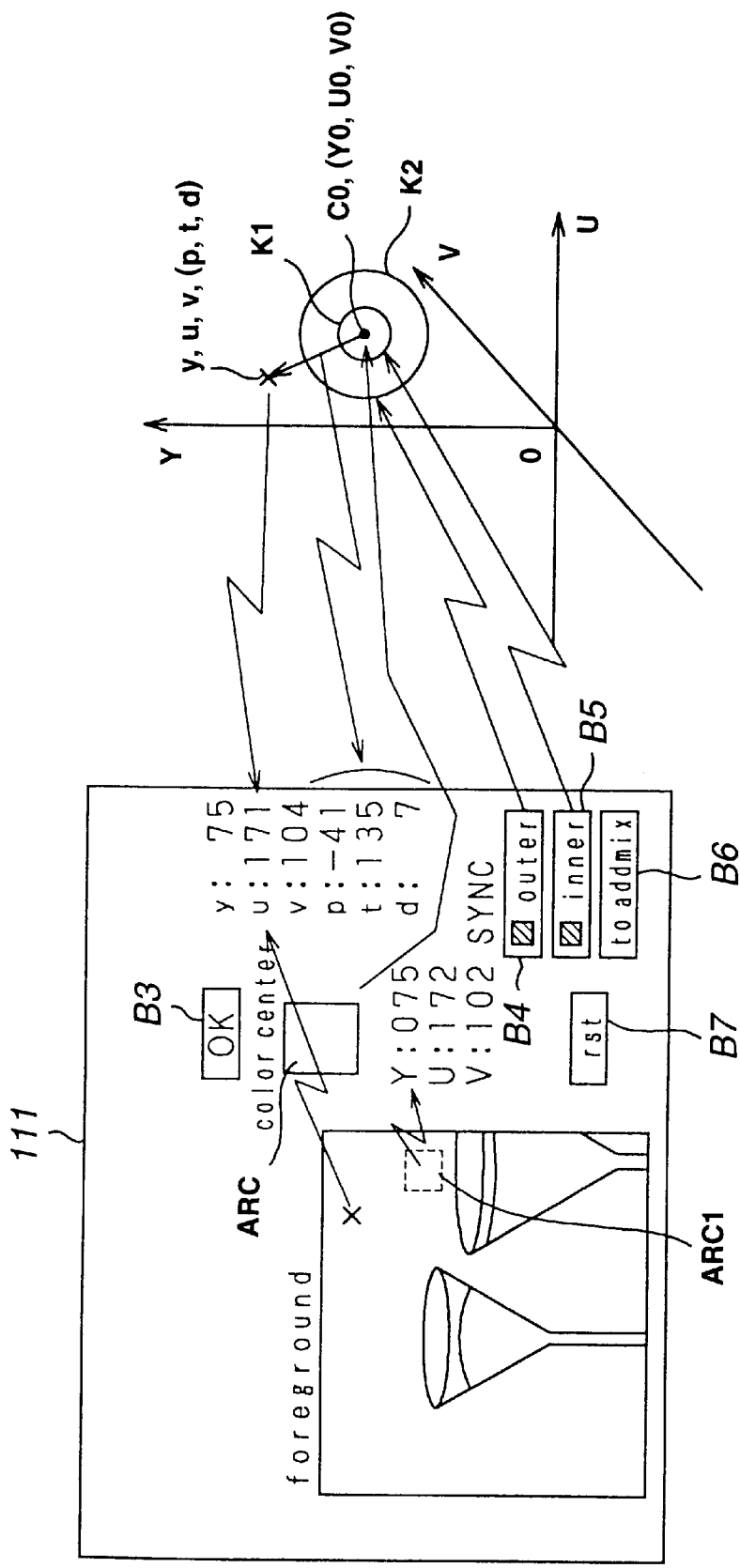
FIG. 22 shows a center color setting section of the key parameter setting screen.

FIG. 22 is a schematic view showing the relation between the center color setting section 111 in the key parameter setting screen 101 of FIG. 20 and chroma key processing. In this center color setting section 111, the same still picture as the foreground picture in the preview screen 102 is displayed as the foreground picture (foreground). A display area ARC for the center color CO and display areas for the luminance level Y and the hues U, V of the center color CO are formed adjacently to the foreground picture.

When the short area ARC1 is designated by operating the mouse 13 on the foreground picture (foreground), the central processing unit 10 of FIG. 1 carries out an event registered on this display area of the foreground picture. The central processing unit 10 thus reads out picture data of this short area ARC1 from the frame buffer 3 and calculates the average value of the luminance level and the color difference level, thereby calculating the luminance level Y0 and the hues U0, V0 of the center color CO. In addition, the central processing unit 10 displays the center color in the display area ARC for the center color CO by the calculated luminance level Y0 and hues U0, V0, and displays the calculated levels in the display areas for the luminance level Y and the hues U, V.

The central processing unit 10 sets the representative points P0 to P25 by using default values with reference to the center color CO, and sets two spherical shapes K1 and K2 to be references for key signal generation on a three-dimensional color space. In this case, the central processing unit 10 sets the representative points at predetermined distances from the center color, respectively.

Figure 23:
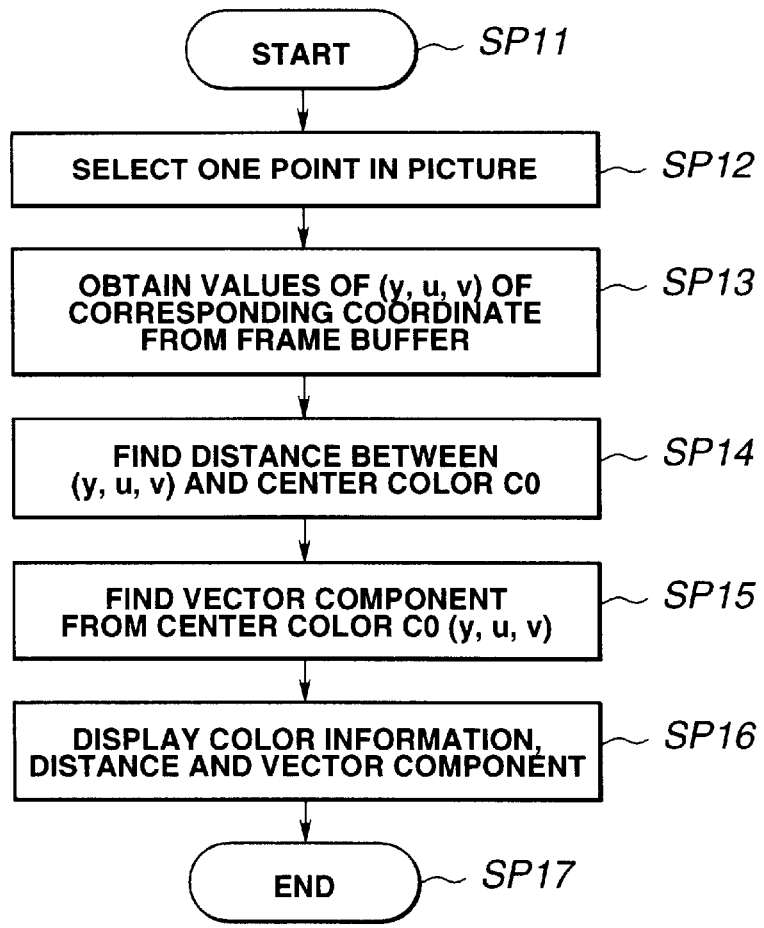
FIG. 23 is a flowchart for illustrating processing of a pixel in a foreground picture.

After thus setting the center color CO, when a predetermined position on the foreground picture (foreground) is clicked by operating the mouse 13 as indicated by x, the central processing unit 10 similarly carries out an event registered on the foreground picture (foreground), thereby carrying out processing procedures shown in FIG. 23. Specifically, the central processing unit 10 shifts from step SP11 to step SP12 to obtain the coordinate clicked on the foreground picture (foreground), and at the subsequent step SP13, reads out picture data of the clicked position from the frame buffer 3.

Then, the central processing unit 10 calculates the luminance level y and the color difference levels u, v of the picture data, and at the subsequent step SP 14, carries out arithmetic processing of the following equation. Thus, the central processing unit 10 calculates a distance d from the center color CO(Y0, U0, V0) with respect to the pixel of the clicked position.

$$d=((y-Y0)^2+(u-U0)^2+(v-V0)^2)^{1/2} \tag{18}$$

Figure 24:
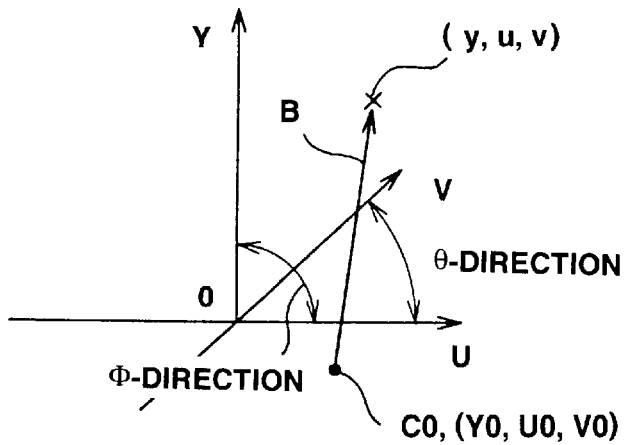
FIG. 24 shows the relations between luminance, color difference, angle and distance in the processing procedures of FIG. 23.

Then, the central processing unit 10 shifts to step SP15 and carries out arithmetic processing of the following equation, thereby calculating angles p and t in the θ-direction and the φ-direction based on the center color CO as the origin, as shown in FIG. 24. These angles p and t in the θ-direction and the φ-direction are expressed by setting the counterclockwise direction as a positive direction with reference to the U-axis.

$$p = \arctan \frac{v - V0}{u - U0} \tag{19}$$

$$t = \arcsin \frac{y - Y0}{d} \tag{20}$$

By this series of arithmetic processing, the central processing unit 10 calculates a vector B from the center color CO to the clicked pixel, using the polar coordinate. Then, the central processing unit 10 shifts to step SP16. The central processing unit 10 displays the vectors p, t, d of the clicked pixel with reference to the luminance level y, the hues u and v, and the center color CO, adjacently to the display of the center color. Then, the central processing unit 10 shifts to step SP17 to end this processing procedure.

After thus setting the center color CO, the central processing unit 10 forms the key parameter screen so that the relation with the center color CO may be easily grasped by clicking a portion to be replaced with the background at an appropriate timing. Thus, easiness in handling is improved. In this first embodiment, when the mouse is thus clicked on the foreground picture, the central processing unit 10 displays a marker at a corresponding position in the vector scope display section and the color space display section as later described, thereby improving easiness in handling.

In the operation in the vector scope display section as later described, a portion to be operated to enable replacement of the corresponding portion with the background without affecting portions of other colors may be determined from the angles θ and φ. Also, the relative relation with the position of a key edge where the change of key signal is switched is determined from the distance information d. Thus, the size of the outer sphere K1 or the inner sphere K2 may be varied for adjustment of chroma key processing.

In the center color setting section 111 (FIG. 22), an admission button (OK) 3B corresponding to determination processing of step SP6 (FIG. 17) is arranged on the upper side of the display area ARC for the center color CO. When this button (OK) is clicked by operating the mouse 13, the central processing unit 10 ends the condition setting processing of chroma key processing.

On the lower right side, change mode switch buttons (outer) B4 and (inner) B5 with respect to the outer sphere K1 and the inner sphere K2 are arranged. The change mode switch buttons B4, B5 are constituted by toggle switches for switching the on-off control action. When the buttons B4, B5 are clicked to be on by operating the mouse 13, a red display is formed in the buttons B4, B5.

In the case where the change mode switch button B4 with respect to the outer sphere K1 is on, when the outer sphere K1 or the inner sphere K2 is held and drawn by the mouse 13 in the color space display section, the central processing unit 10 changes the coordinate of the representative points P0 to P25 with reference to the center point CO so as to uniformly enlarge or reduce the size of the outer sphere K1 in accordance with the drawing operation. Similarly, in the case where the change mode switch button B5 with respect to the inner sphere K2 is on, when the outer sphere K1 or the inner sphere K2 is held and drawn by the mouse 13 in the color space display section 112, the central processing unit 10 changes the coordinate of the representative points P0 to P25 with reference to the center point CO so as to uniformly enlarge or reduce the size of the inner sphere K2 in accordance with the drawing operation.

Thus, the central processing unit 10 forms the center color setting section 11 1 so that desired processing results may be obtained by a simple operation, along with the information displays y, u, p, t, d at the positions clicked by the mouse 13.

In addition, in the center color setting section 111, a chroma key processing selection button B6 is arranged below the change mode switch button (inner) B5. This button B6 is constituted by a toggle switch and can select chroma key processing by the editing device 1 from the processing corresponding to the Equations (15) to (17).

In the center color setting section 111, a reset button (rst) B7 is arranged adjacently to these buttons. When the reset button B7 is clicked by the mouse 13, the central processing unit 10 resets the coordinate of the representative points P0 to P25 to the initial default values. Thus, the central processing unit 10 controls the entire operation so as to easily return to the initial state even when the conditions are changed in various manners.

Figure 25:
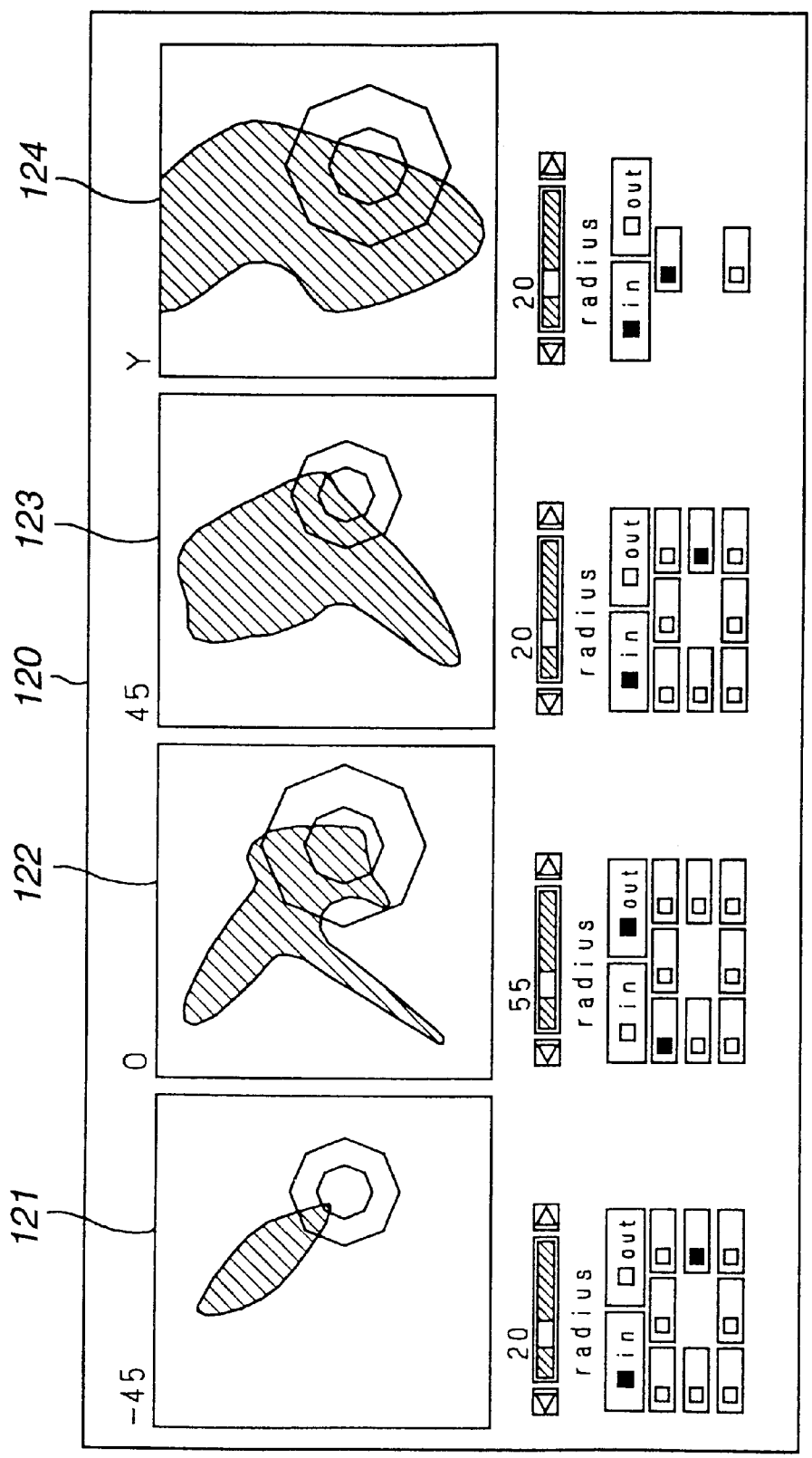
FIG. 25 shows a vector scope display section.

FIG. 25 is a schematic view showing the vector scope display section 120. This vector scope display section 120 includes first to fourth display sections 121 to 124, and adjustment buttons allocated to the respective display sections. In the first to third display sections 121 to 123, reference planes perpendicular to the Y-axis are set to cross representative points on UY planes arranged at angles of −45 degrees, 0 degree, and 45 degrees with respect to the U-axis, and lines formed by the reference planes crossing the inner sphere K1 and the outer sphere K2 and a projected picture of pixels of a neighboring foreground picture are displayed and formed. Thus, distribution of the pixels of the foreground picture may be intuitively grasped through the first to third display sections 121 to 123, with respect to the direction along the Y-axis.

Figure 26:
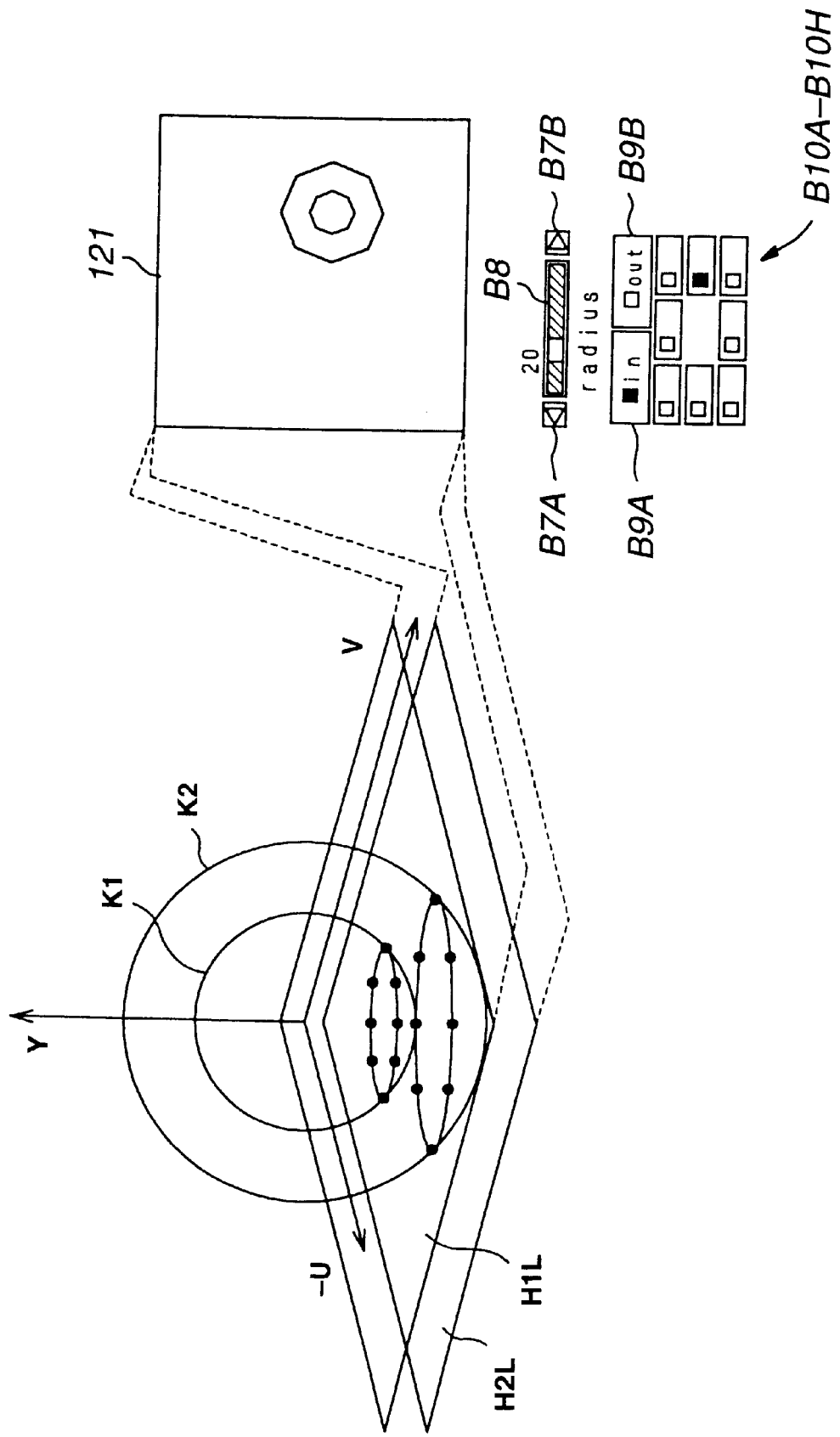
FIG. 26 illustrates a first display section of the vector scope display section.

Specifically, in the first display section 121, as shown in FIG. 26, reference planes H1L and H2L are set to cross representative points on the UY plane arranged at an angle of −45 degrees with respect to the U-axis, and lines formed by the reference planes H1L and H2L crossing the inner sphere K1 and the outer sphere K2 are displayed. Also, a picture formed by projecting pixels of a luminance level not higher than a predetermined luminance level set with reference to the planes H1L and H2L is displayed. At this point, each pixel is set to the predetermined luminance level corresponding to the reference planes H1L and H2L and is displayed in accordance with the hue of each pixel.

Figure 27:
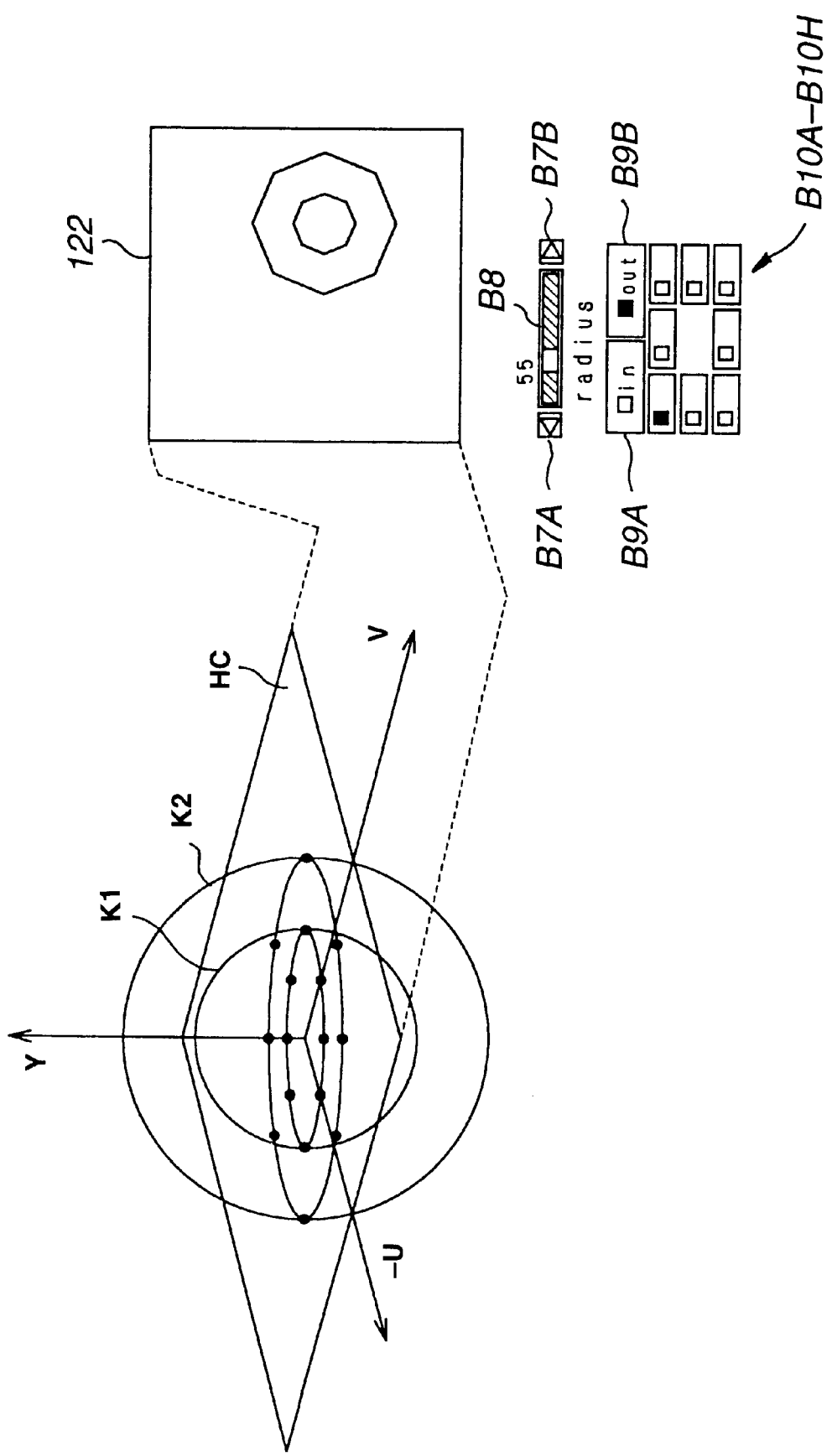
FIG. 27 illustrates a second display section of the vector scope display section.

On the other hand, in the second display section 122, as shown in FIG. 27, a reference plane HC crossing representative points arranged on the U-axis is set, and a line formed by the reference plane HC crossing the inner sphere K1 and the outer sphere K2 is displayed. In addition, a picture formed by projecting pixels of a predetermined luminance level set with reference to the reference plane HC is displayed. At this point, each pixel is set to the predetermined luminance level corresponding to the reference plane HC and is displayed in accordance with the hue of each pixel.

Figure 28:
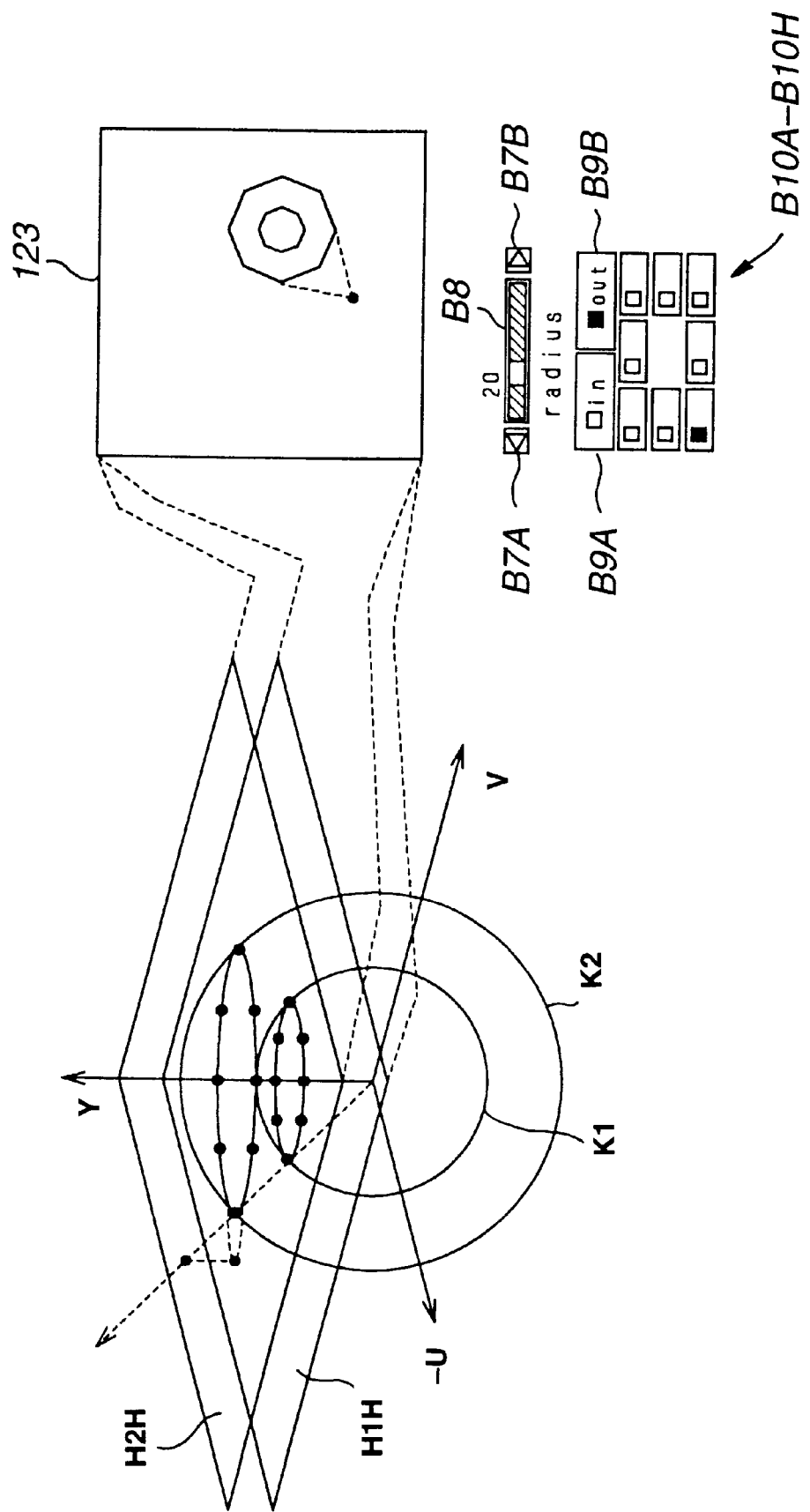
FIG. 28 illustrates a third display section of the vector scope display section.

In the third display section 123, as shown in FIG. 28, reference planes H1H and H2H crossing representative points on the UY plane arranged at an angle of 45 degrees with respect to the U-axis are set, and lines formed by the reference planes H1H and H2H crossing the inner sphere K1 and the outer sphere K2 are displayed. Also, a picture formed by projecting pixels of a luminance level not higher than a predetermined luminance level set with reference to the planes H1H and H2H is displayed. At this point, each pixel is set to the predetermined luminance level corresponding to the reference planes H1H and H2H and is displayed in accordance with the hue of each pixel.

The lines crossing the inner sphere K1 and the outer sphere K2 are displayed in an octagonal shape so that the corresponding relation with the representative points may be easily grasped and so that the portions corresponding to the representative points may be held by the mouse 13 to enable easy change of the positions of the representative points.

Below the first to third display sections 121 to 123, a pair of buttons B7A and B7B for adjusting the distance from the center color CO to the representative point, and a scroll bar B8 for adjusting and displaying the distance are arranged. On an upper part of the scroll bar B8, the distance from the center color CO to the representative point is displayed with a numeral. Thus, by comparison with the distance d from the center color CO displayed in the center color setting section, the central processing unit 10 may operate these buttons to easily adjust the characteristics of the chroma key.

Further below the first to third display sections 121 to 123, selection buttons B9A and B9B for selecting the inner sphere K1 and the outer sphere K2 are arranged, and eight buttons B10A to B10H corresponding to the representative points of the inner sphere K1 or the outer sphere K2 in each display section are arranged below the selection buttons. The central processing unit 10 forms a red display in each of the selection buttons B9A and B9B in response to the selection operation of the selection buttons B9A and B9B. Also, the central processing unit 10 switches the change of the representative points to an acceptable state by operating the buttons arranged below the selection buttons B9A and B9B and by operating the buttons B7A, B7B and the scroll bar B8, with respect to the inner sphere K1 or the outer sphere K2.

Specifically, when any one of the buttons B10A to B10H is operated to be on after the button B9B for the outer sphere K2 is clicked by the mouse 13, the central processing unit 10 changes the distance from the center color CO to the representative point of the outer sphere K2 corresponding to the operated button B10A to B10H, in response to the operation of the buttons B7A and B7B or in response to the operation of the button in the scroll bar B8. Thus, as indicated by a broken line in FIG. 28, the position of the representative point constituting the outer sphere K2 is changed to adjust the outer sphere K2.

When a display position corresponding to each representative point is held and operated by the mouse 13 in each display section, the central processing unit 10 similarly changes the position of the representative point and switches the display in each display section in response to the operation by the mouse 13. Similarly, when the representative point of the inner sphere K1 or the outer sphere K2 is changed by operation in the color space display section, the display of the inner sphere K1 and the outer sphere K2 in each display section is changed.

Figure 29:
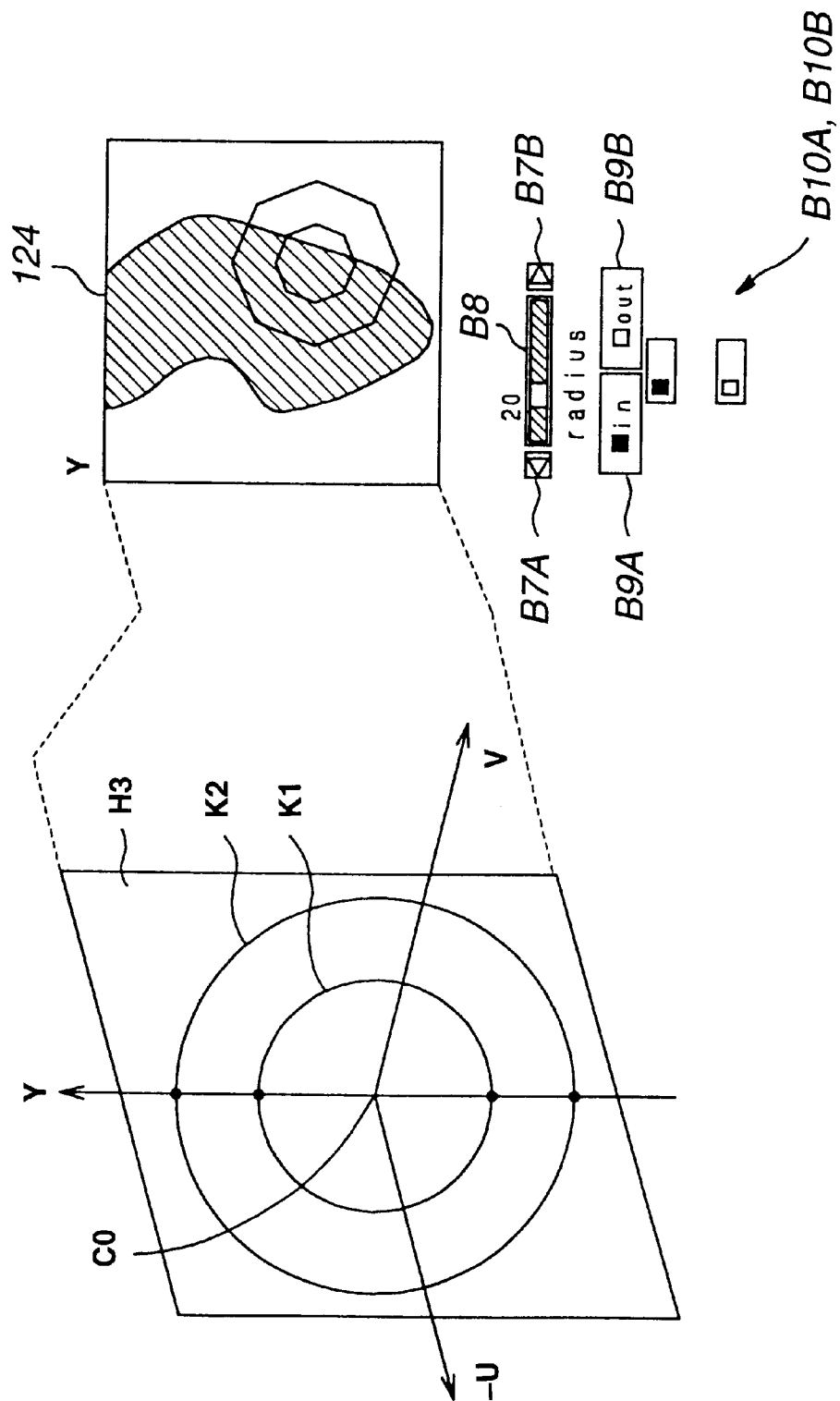
FIG. 29 illustrates a fourth display section of the vector scope display section.

On the other hand, in the fourth display section 124, a reference plane H3 parallel to the UY plane passing the center color CO is set, and a line formed by the reference plane H3 crossing the inner sphere K1 and the outer sphere K2 is displayed, as shown in FIG. 29. In addition, pixels of the three-dimensional color space are projected and displayed on the reference plane H3. At this point, each pixels is set to a predetermined luminance level and is displayed with white color.

Below the fourth display section 124, a pair of buttons B7A and B7B for adjusting the distance from the center color CO to the representative point, and a scroll bar B8 for adjusting and displaying the distance are arranged. On an upper part of the scroll bar B8, the distance from the center color CO to the representative point is displayed with a numeral. Thus, by comparison with the distance d from the center color CO displayed in the center color setting section, the central processing unit 10 may operate these buttons to easily adjust the characteristics of the chroma key.

Further below the fourth display section 124, selection buttons B9A and B9B for selecting the inner sphere K1 and the outer sphere K2 are arranged, and two buttons B10A and B10B corresponding to the representative points on the Y-axis of the inner sphere K1 or the outer sphere K2 are arranged below the selection buttons. The central processing unit 10 forms a red display in each of the selection buttons B9A and B9B in response to the selection operation of the selection buttons B9A and B9B. Also, the central processing unit 10 accepts the change of the representative points by operating the buttons B10A, B10B arranged below the selection buttons B9A and B9B and by operating the buttons B7A, B7B and the scroll bar B8, with respect to the inner sphere K1 or the outer sphere K2.

With respect to the fourth display section 124, when a display portion corresponding to each representative point is held and operated by the mouse 13, the central processing unit 10 similarly changes the position of the representative point and switches the display in the display section in response to the operation by the mouse 13. Similarly, when the representative point of the inner sphere K1 or the outer sphere K2 is changed by operation in the color space display section 112, the display of the inner sphere K1 and the outer sphere K2 in each display section is changed.

Figure 30:
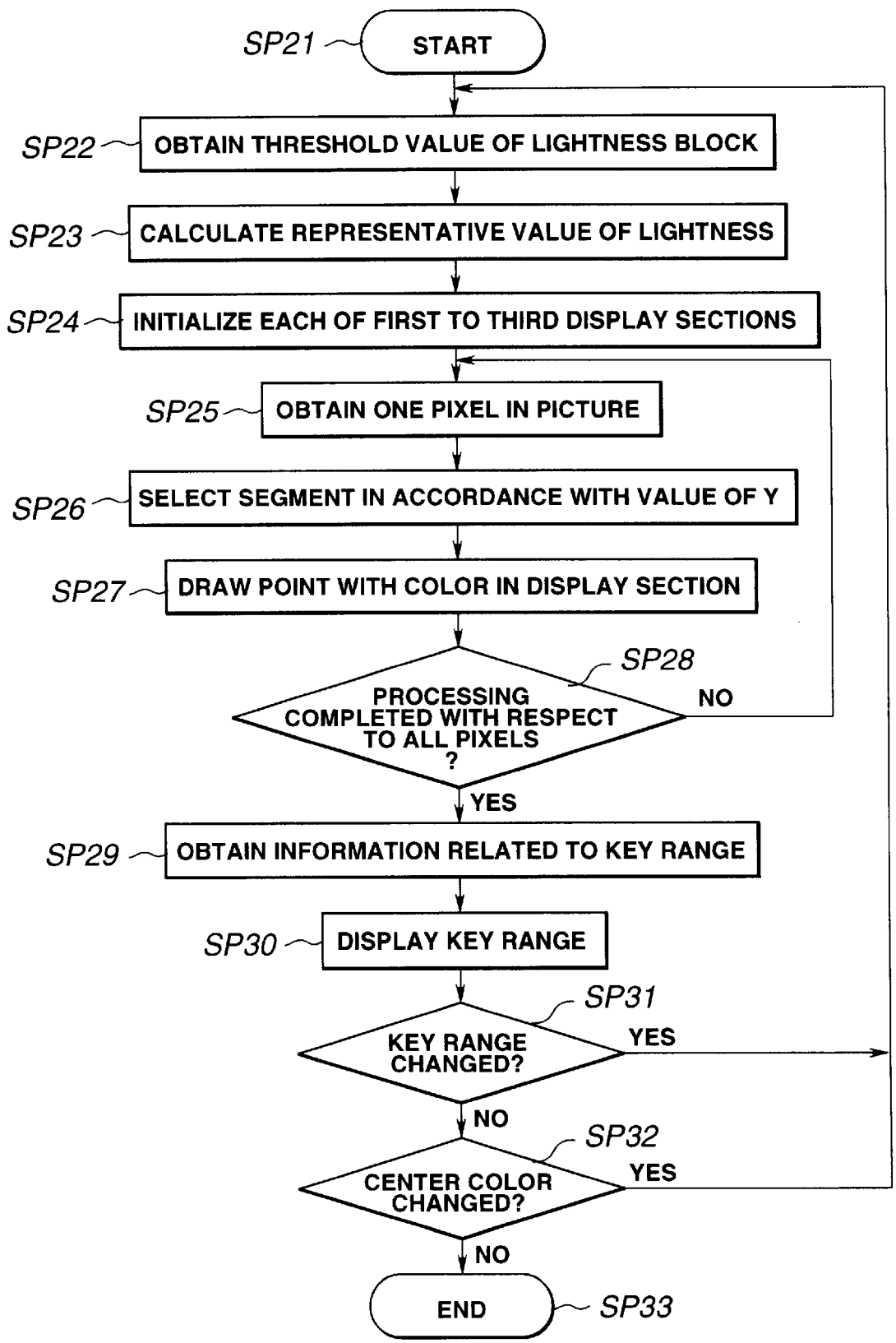
FIG. 30 is a flowchart showing display processing in the first to third display sections.

FIG. 30 is a flowchart showing processing procedures of projection of the foreground picture in the central processing unit 10 in thus displaying the inner sphere K1 and the outer sphere K2. When the inner sphere K1 and the outer sphere K2 are set with default values, or when the position of a representative point is changed by operation in the color space display section 112 and the vector scope display section 120, or when a center color is newly selected in the center color setting section, the central processing unit 10 sequentially carries out events registered to the vector scope display section 120, thereby carrying out the processing procedures.

Figure 31:
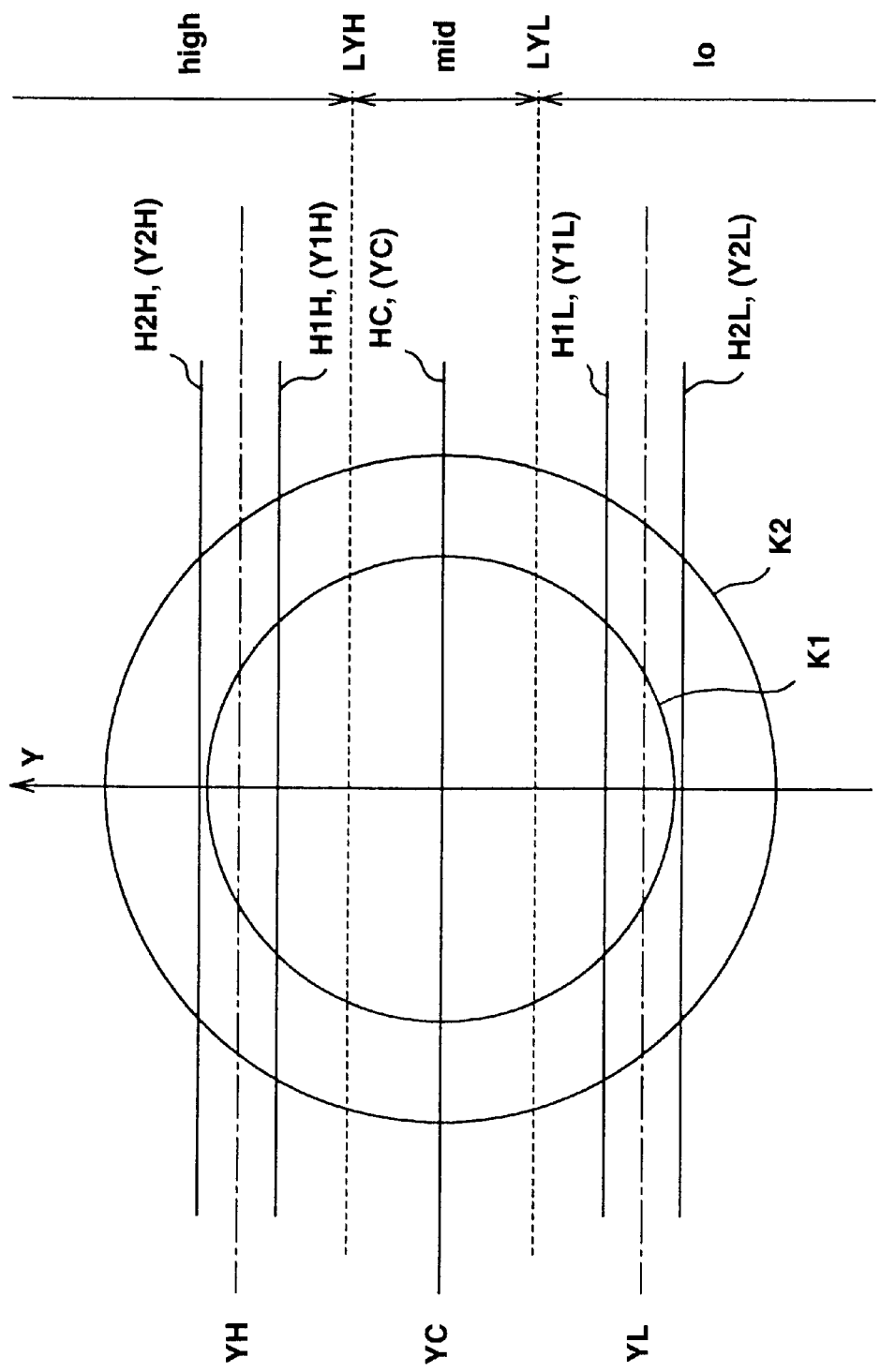
FIG. 31 illustrates the processing procedures of FIG. 30.

Specifically, the central processing unit 10 shifts fro step SP21 to step SP22 so as to set lightness (luminance level) segments. As shown in FIG. 31, the central processing unit 10 sets threshold values LYL and LYH of luminance level with reference to the luminance levels Y1L, Y2L, YV, Y1H, Y2H of the reference planes H1L, H2L, HV, H1H, H2H set in the first to third display sections 121 to 123, and thus sets three luminance level segments lo, mid, high corresponding to the first to third display sections 121 to 123.

Then, the central processing unit 10 shifts to step SP23 so set reference values YH, YC, YL of lightness (luminance level) with respect to the respective segments high, mid, lo. In this embodiment, the reference value YL corresponding to the first display section 121 is set to be the average value of the luminance levels Y1L, Y2L of the reference planes H1L, H2L set with respect to the first display section 121. The reference value YH corresponding to the third display section 123 is set to be the average value of the luminance levels Y1H, Y2H of the reference planes H1H, H2H set with respect to the third display section 123. The threshold values LYL, LYH are set to be the average value of the reference values YL, YC and the average value of the reference values YC, YH, respectively.

Subsequently, the central processing unit 10 shifts to step SP24 to color the display in the first to third display sections with black, thereby initializing the first to third display sections 121 to 123. Then, the central processing unit 10 shifts to step SP25. The central processing unit 10 loads picture data from the frame buffer 3 with respect to one pixel of the foreground picture.

At the subsequent step SP26, the central processing unit 10 determines the segment high, mid, or lo to which the loaded picture data belong with reference to the luminance level of the picture data. In addition, the central processing unit 10 distributes the picture data to any one of the segments high, mid, lo from the result of determination, and sets the luminance level of the picture data to the reference value of the corresponding segment.

Then, the central processing unit 10 shifts to step SP27 to display the picture data in the display section corresponding to the segment to which the picture data are distributed. At this point, the central processing unit 10 sets the horizontal direction and the vertical direction of each display section to the U-axis and the V-axis, respectively. The central processing unit 10 selects the position corresponding to the hue of the picture data and carries out point display of the picture data at this position. In addition, the central processing unit 10 carries out point display by using the luminance level set to the reference value at step SP23 or by using the hue of the picture data.

Thus, on completion of point display with respect to one pixel, the central processing unit 10 shifts to step SP28 to determine whether or not point display is completed with respect to all the pixels of the foreground picture. If a negative result is obtained, the central processing unit 10 returns to step SP25. The central processing unit 10 repeats the processing procedures of steps SP25, SP26, SP27, SP28 and SP25 so as to display each pixel in the corresponding display section in accordance with the luminance level of each pixel forming the foreground picture. On completion of display of all the pixels, the central processing unit 10 shifts to step SP29.

The central processing unit 10 obtains information related to a key range. The information related to a key range is coordinate data of lines formed by the above-described reference planes H1L, H2L, HC, H1H, H2H crossing the inner sphere K1 and the outer sphere K2. On obtaining this information, the central processing unit 10 shifts to step SP30 to display the lines in each display section.

Subsequently, the central processing unit 10 shifts to step SP31 to determine whether the key range (that is, the position of the representative points) is changed or not. If a positive result is obtained, the central processing unit 10 returns to step SP22. Thus, when the representative points are changed, the central processing unit 10 newly switches the display of the display section so as to enable easy determination of distribution of each pixel with respect to the inner sphere K1 and the outer sphere K2 formed by the representative points.

On the contrary, if a negative result is obtained at step SP31, the central processing unit 10 shifts from step SP31 to step SP32 to determine whether the center color CO is changed or not. If a positive result is obtained, the central processing unit 10 returns to step SP22 to newly switch the display of each display section. Thus, even when the center color CO is changed, the central processing unit 10 enables easy determination of distribution of each pixel with respect to the inner sphere K1 and the outer sphere K2 changed in accordance with this change of the center color.

On the contrary, if a negative result obtained at step SP32, the central processing unit 10 shifts from step SP32 to step SP33 to end this processing procedure.

When the foreground picture is clicked by the mouse 13 in the center color setting section 111, the central processing unit 10 displays a marker at a corresponding position in the first to fourth display sections 121 to 124, along with the display of the angles p, t in the center color setting section 111. Thus, in the editing device 1, the relation between each pixel of the foreground picture and the inner sphere K1 and the outer sphere K2 may be easily grasped so that easiness in handling may be improved.

Figure 32:
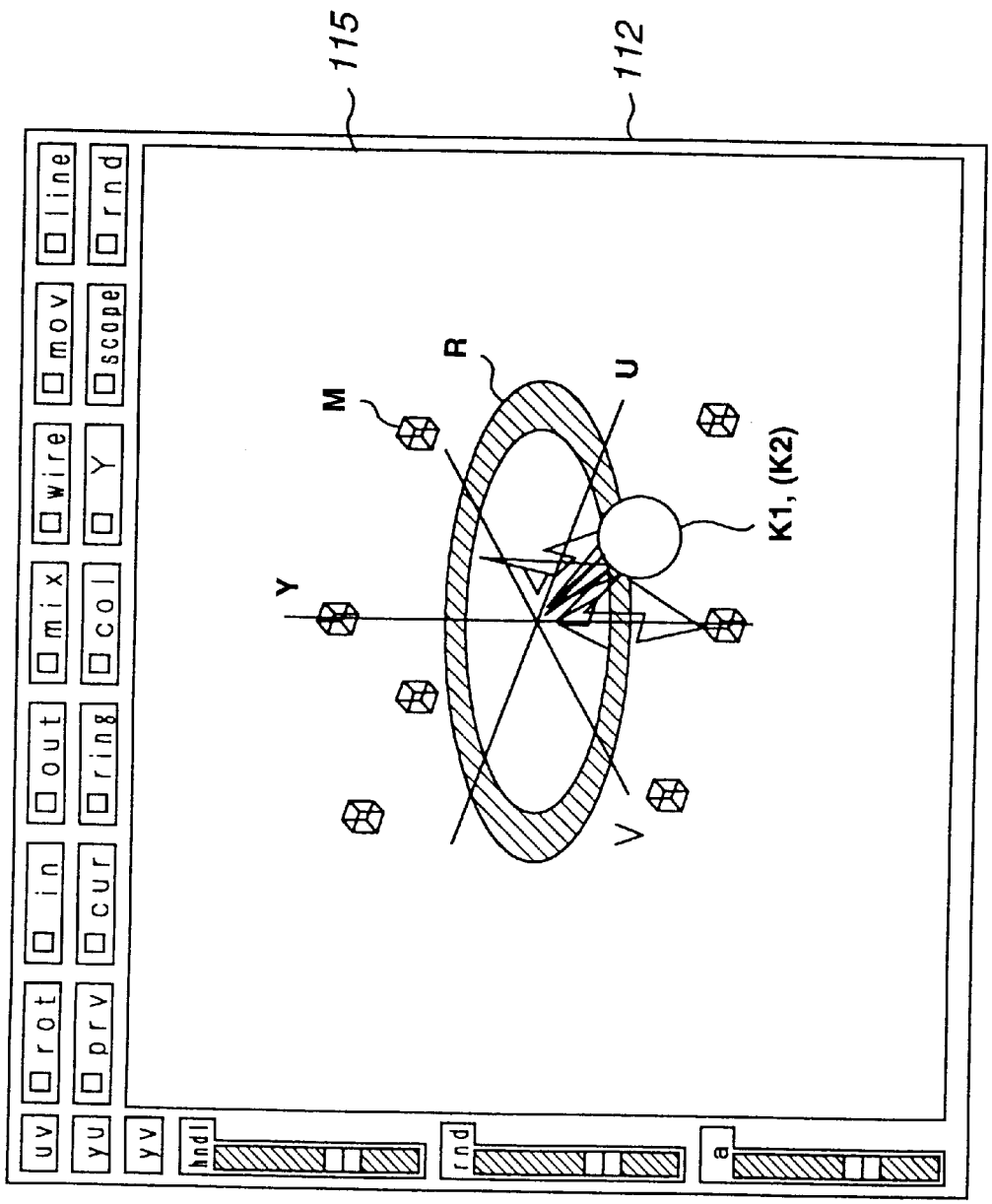
FIG. 32 shows an example of a color space display section.
Figure 33A:
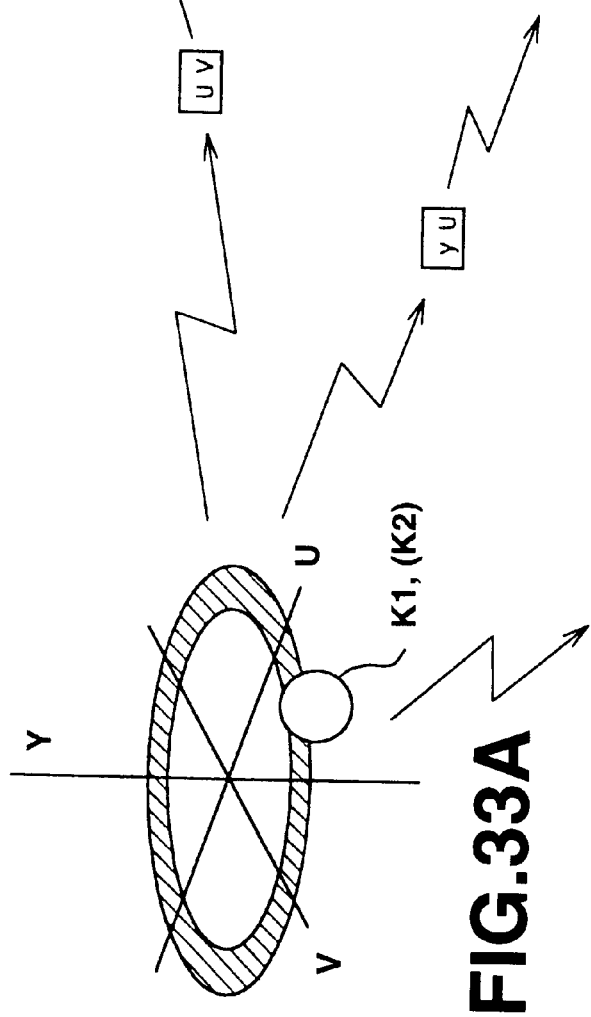
FIG. 33 illustrates switching of a viewpoint in the color space display section.
Figure 33B:
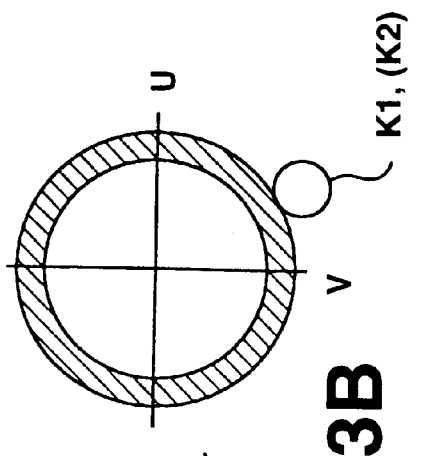
Figure 33C:
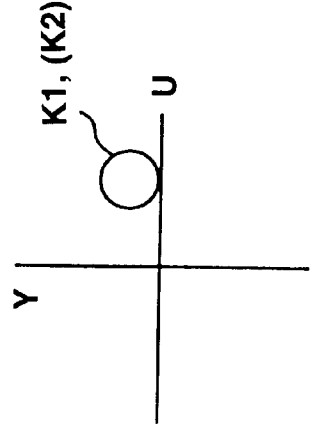
Figure 33D:
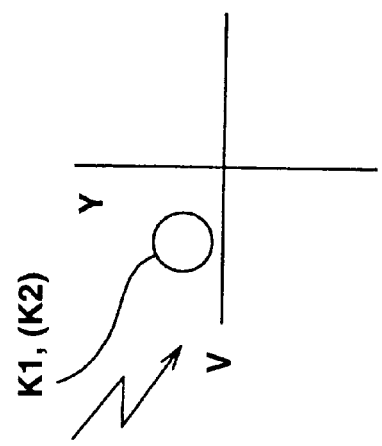

FIG. 32 is a schematic view showing the color space display section 112. This color space display section 112 includes a picture display section 115 for displaying a picture formed by viewing the inner sphere and the outer sphere located in the three-dimensional color space and the pixels of the foreground picture from a predetermined direction, and buttons for changing the contents and viewpoint of the picture.

Specifically, at an upper left part of the color space display section 112, a button (uv) for designating the UV plane, a button (yu) for designating the YU plane, and a button (yv) for designating the YV plane are arranged. As shown in FIGS. 33A–33D, the central processing unit 10 displays a picture formed by viewing the color space from a viewpoint set in a predetermined direction, onto the picture display section 115 (FIG. 33(A)). When the respective buttons (uv), (yu), (yv) are operated, the central processing unit 10 carries out events registered to the buttons so as to display pictures formed by viewing the UV plane, the YU plane, and YV plane (FIGS. 33(B) to (D)).

In the color space display section 112, a rotation operation button (rot) is arranged adjacently to the button (uv) for designating the UV plane. As shown in FIGS. 34A–34D, when this button (rot) is operated to be on in the state where the picture formed by viewing the color space from the predetermined direction is displayed on the picture display section 115 (FIG. 34(A)), the central processing unit 10 sets the Y-axis, U-axis, and V-axis designated by the subsequent operation of the mouse 13 to the rotational center axis in this state of display. In addition, the central processing unit 10 rotates the color space as indicated by an arrow with respect to the rotational center axis, in response to the operation of the mouse 13 (FIGS. 34(B) to (D)). Thus, the central processing unit 10 forms the color space display section 112 so that the relation between the inner sphere K1, the outer sphere K2 and each pixel of the foreground picture may be easily grasped by viewing the color space from various directions, if necessary.

In the color space display section 112, a button (in) for designating the inner sphere K1 and a button (out) for designating the outer sphere K2 are also arranged. When the button (in) or (out) is operated to be on by the mouse 13, the central processing unit 10 displays the inner sphere K1 or the outer sphere K2 on the picture display section 115. Also, in the color space display section 112, a button (mix) for switching the display mode of the inner sphere K1 and the outer sphere K2 is arranged. When this button (mix) is operated by the mouse 13, the central processing unit 10 switches the display of the inner sphere K1 and the outer sphere K2 between display on an opaque plane and display on a semi-transparent plane. Thus, the central processing unit 10 forms the color space display section 112 so that the relation between each pixel of the foreground picture and the inner sphere and the outer sphere may be easily confirmed by switching the display of the inner sphere K1 and the outer sphere K2, if necessary, and also by switching the display mode thereof.

In addition, in the color space display section 112, a button (wire) for switching the display form of the inner sphere K1 and the outer sphere K2 is arranged. When this button (wire) is operated to be off, the central processing unit 10 displays the inner sphere K1 and the outer sphere K2 in the form of plane. When the button (wire) is operated to be on, the central processing unit 10 displays the inner sphere K1 and the outer sphere K2 in the form of wire frame defined by lines connecting adjacent representative points. Thus, the central processing unit 10 forms the color space display section 112 so that the relation between each pixel of the foreground picture and the inner sphere and the outer sphere may be easily confirmed by switching the display form of the inner sphere K1 and the outer sphere K2, if necessary.

Moreover, in the color space display section 112, a button (mov) for sequentially changing the display of the color space by a small angle is arranged. When this button (mov) is operated, the central processing unit 10 sets a virtual rotational axis corresponding to the vertical direction of the picture display section 115 into the color space, and displays the color space while sequentially displacing the color space by a predetermined angle around the rotational axis. Thus, the central processing unit 10 forms the color space display section 112 so that the relation between each pixel of the foreground picture and the inner sphere and the outer sphere may be easily confirmed by sequentially changing the viewpoint.

In the color space display section 112, a button (line) for switching the display form of each pixel of the foreground picture is arranged. When this button (line) is operated to be off, the central processing unit 10 maps each pixel of the foreground picture into the color space by using a point image. On the contrary, when this button (line) is operated to be of, the central processing unit 10 connects the point images of the respective pixels on the foreground screen by a bright line in the order of raster operation. Thus, the central processing unit 10 forms the color space display section 112 so that the relation between each pixel of the foreground picture and the inner sphere and the outer sphere may be easily confirmed by switching the display form of each pixel, if necessary.

In the color space display section 112, a button (prv) for switching display/non-display with respect to the pixels of the foreground picture is arranged adjacently to the button (yu) for designating the YU plane. When this button (prv) is operated to be off, the central processing unit 10 suspends display of the pixels of the foreground picture. This display of the pixels uses the hue and luminance level corresponding to each pixel so that the relation between the inner sphere and the like and each pixel may be easily grasped even when the color space is viewed from various viewpoints.

Also, in the color space display section 112, a button (cur) for switching display/non-display of the UV axis is arranged. The central processing unit 10 switches the display of the U-axis and V-axis in response to the on-off control section of the button (cur). In addition, in the color space display section 112, a button (ring) for switching display/non-display with respect to a hue ring R is arranged. The central processing unit 10 arranges a hue ring R which indicates the hue at each position by a color, on the UV plane, and switches the display of this ring R in response to the on-off control action of this button (ring). Thus, the central processing unit 10 forms the color space display section 112 so that the relation between the inner sphere, the outer sphere and the foreground picture on the three-dimensional color space may be visually grasped even when the color space is viewed from various viewpoints.

In the color space display section 112, a button (col) for switching display/non-display of a marker is arranged. When this button (col) is operated to be on, the central processing unit 10 displays a box-shaped marker M at a portion of each color expressed by a color bar. Thus, the central processing unit 10 forms the color space display section 112 so that the relation between the inner sphere, the outer sphere and the foreground picture on the three-dimensional color space may be easily grasped even by an operator who is accustomed to the use of ordinary image equipments.

In the color space display section 112, a button (Y) for switching display/non-display of the Y-axis is also arranged. The central processing unit 10 switches the display of the Y-axis in response to the on-off control action of this button (Y). Also, in the color space display section, a button (scope) for enlarging/contracting the display of the picture display section 115 is arranged. When this button (scope) is operated, the central processing unit 10 enlarges or contracts the display of the color space in response to the subsequent operation of the mouse 13.

In the color space display section 112, a button (rud) for switching to a display mode in consideration of the number of pixels with respect to the display of the pixels of the foreground picture is arranged. When this button (rud) is operated to be off, the central processing unit 10 forms a point image of each pixel in the color space in accordance with the luminance level and hue of each pixel. In this case, the central processing unit 10 forms point images overlapping at the same portion, with respect to a plurality of pixels of the same hue and the same luminance level. On the contrary, when this button (rud) is operated to be on, the central processing unit 10 corrects the luminance level and hue of each pixel by using predetermined random numbers and displays the corrected luminance level and hue. Thus, the central processing unit 10 forms the color space display section 112 so that, with respect to a plurality of pixels of the same hue and the same luminance level, concentration of the number of pixels may be visually sensed easily by slightly shifting the display positions of point images and displaying the point images to have an area corresponding to the number of pixels.

For such display, scroll bars for varying the degree of display are arranged on the left side of the color space display section 112. When the lowermost scroll bar (a) of these scroll bars is operated, the central processing unit 10 varies the overall brightness in the picture display section 115. When a scroll bar (rud) is operated, the central processing unit 10 varies the maximum value of the random numbers used in the operation of the button (rud). When a scroll bar (hnd1) is operated, the central processing unit 10 enlarges/contracts the display of the representative points located on the inner sphere K1 and the outer sphere K2 and the display of the center color.

In the picture display section 115, when the display of the representative points and the display of the center color which are varied in size by thus operating the scroll bar (hnd1) are held and moved by the mouse 13 (FIG. 4), the central processing unit 10 changes the representative points and the center color in accordance with this movement by the mouse. At this point, when the change mode switch buttons (outer) B4 and (inner) B5 are operated to be on, the radius of each representative point of the inner sphere K1 or the outer sphere K2 is varied so as to correspond to the change in radius due to the change in any one representative point. Thus, the overall size of the inner sphere K1 or the outer sphere K2 is varied. When the center color is changed, each representative point is changed so that the relation between the center color and each representative point is maintained.

When the representative points are changed in the vector scope display section, the central processing unit 10 changes the display of the inner sphere K1 and the outer sphere K2 in the color space display section 112 in accordance with this change in the vector scope display section. When the center color is changed by the center color setting section 111, the central processing unit 10 switches the display of the inner sphere K1 and the outer sphere K2, similarly to the case where the center color is changed in the picture display section 115. In addition, when any one of the pixels is selected by clicking the mouse 13 in the center color setting section 111, the central processing unit 10 displays a marker in the picture display section 115 in accordance with the display of the radius d or the like.

Referring to FIG. 1 again, the operation of the first embodiment of the present invention will now be described.

In the editing device 1 of FIG. 1, after image signals SV1, SV2 as editing processing targets are recorded onto the hard disk drive 2, an editing list is prepared by these image signals SV1, SV2. In accordance with the editing list, the image signals SV1, SV2 are edited and recorded onto the hard disk drive 2.

In preparation of such editing list, in the editing device 1, when the operator selects chroma key processing, the key parameter setting screen and the preview screen are displayed on the monitor 9 (as shown in FIGS. 25 and 18), and corresponding picture data are inputted to the frame buffers 3 and 4 from the hard disk drive 2. Thus, a foreground picture and a background picture selected by the operator are displayed in the form of still picture on the key parameter setting screen and the preview screen.

In the editing device 1, when the operator designates a part of an area allocated to the background picture as a short shape by operating the mouse 13 in the foreground picture on the key parameter setting screen (FIG. 25), picture data corresponding to this area are read out from the frame buffer 3 and averaged so as to determine the center color CO (Y0, U0, V0) of chroma key processing. By this averaging processing, the editing device 1 effectively avoids the influence of noise and the like, and sets a color desired by the operator to the center color by a simple operation.

On the YUV space, two types of representative points spaced from the center color CO by a predetermined distance are set at a conformal spacing of 45 degrees centering the center color CO. By these two types of representative points, double spherical shapes K1, K2 centering the center color CO are set with default values. Thus, the editing device 1 sets boundaries K1 and K2 switching the characteristics of the key signal KEY, under standard conditions.

Having thus setting the center color CO and the representative points, the editing device 1 displays, on the preview screen, a picture of a chroma key signal under the standard conditions and three types of processing results of chroma key processing using this chroma key signal. Thus, the processing results under the standard conditions may be confirmed. Also, the position of the inner sphere K1 and the outer sphere K2 under the standard conditions on the color space and each pixel of the foreground picture are displayed in the color space display section (FIG. 32). In addition, a picture formed by projecting lines crossing the inner sphere K1 and the outer sphere K2 with respect to a plane on the color space set with reference to each representative point and each pixel of the foreground picture is displayed in the vector scope display section.

Thus, the characteristics of the key signal are changed in various manners through the key signal characteristic setting screen formed by the vector scope display section, the color space display section and the center color setting section, and the result of this processing may be confirmed on the preview screen. Even when each pixel of the foreground picture is expressed in the three-dimensional color space so as to generate the key signal, the result of processing may be grasped in an interactive mode or intuitively, so that desired processing results may be obtained.

Specifically, in the display in this vector scope display section, the editing device 1 projects and displays the lines crossing the inner sphere K1 and the outer sphere K2 with respect to three types of reference planes perpendicular to the Y-axis and the corresponding pixels of the foreground picture. Thus, the operator who operates the editing device 1 can visually grasp distribution of colors of the foreground picture, and can carry out desired chroma key processing by a simple operation, even when each pixel of the foreground picture is expressed on the three-dimensional color space so as to carry out chroma key processing.

Also, since the boundaries K1 and K2 for switching the characteristics of the key signal KEY are displayed together, a range which is to be replaced with the background by chroma key processing (that is, a range constituted by pixels distributed substantially on the inner side of the inner sphere K1) and a range which is not to be replaced with the background by chroma key processing (that is, a range constituted by pixels distributed substantially on the outer side of the outer sphere K2) may be visually confirmed. Therefore, even when each pixel of the foreground picture is expressed on the three-dimensional color space so as to carry out chroma key processing, the operator can set the conditions while presuming the processing results. Thus, easiness in handling is improved.

In the state of such setting, if the operator confirms the preview screen to find that a desired color is not replaced with the background in the presumed manner, the operator shifts the display of lines on the inner sphere K1 and the outer sphere K2 in the vector scope display section by operating the mouse 13, thereby changing the representative points and changing the conditions for chroma key processing (FIG. 28).

Also, the buttons B7A, B7B, B10A to B10H and the scroll bar B8 arranged below the first to fourth display sections are operated, thereby changing the representative points and changing the conditions for chroma key processing (FIGS. 26 to 29).

In this case, with respect to a color desired by the operator, each pixel is displayed on the basis of the hue and reference lightness of each pixel in the first to third display sections in the vector scope display section, and in the form of black and white display in the fourth display section concerning the luminance level. Therefore, the operator may change the conditions for chroma key processing by easily and securely determining a portion where the display of the line on the inner sphere K1 and the outer sphere K2 should be held and moved by the mouse 13.

When the foreground picture is clicked by the operator 13 in the center color setting section, the angle and direction of the clicked pixel viewed from the center color are displayed, and the relation with an area to be replaced with the background picture near the center color is displayed by a numerical value. This relation is displayed to correspond to the display in the vector scope display section, by position information p, t, d in the form of polar coordinate corresponding the setting of the representative points (FIG. 22). Thus, in the vector scope display section, the conditions for chroma key processing may be changed by easily and securely determining a portion on the inner sphere K1 and the outer sphere K2 that should be held and moved by the mouse 13.

Since the conditions for chroma key processing may be changed simply by holding and moving the display of the line on the inner sphere K1 and the outer sphere K2 by the mouse 13, easiness in handling is improved.

Also, the buttons B7A, B7B, B10A to B10H and the scroll bar B8 are arranged in the form corresponding to the display of the position information, below the first to third display sections. As the setting of representative points including key signal setting information is accepted by using the buttons B7A, B7B, B10A to B10H and the scroll bar B8, the conditions for chroma key processing may be changed easily and securely by operating any one of the buttons B7A, B7B, B10A to B10H and the scroll bar B8.

In these cases, in the color space display section, a picture, formed by viewing from a desired direction a three-dimensional color space on which each pixel of the foreground picture, the inner sphere K1 and the outer sphere K2 are arranged, is displayed, and the viewpoint is changed in various manners by operating the mouse 13 so as to change this display. Thus, the relation between the inner sphere K1, the outer sphere K2 and each pixel of the foreground picture may be grasped through the color space display section, if necessary, and the conditions for chroma key processing may be changed by confirming the color space display section and operating the vector scope display section.

At this point, in the color space display section, the display of each pixel, the inner sphere K1 and the outer sphere K2 is switched in response to the operation of the button, and the ring R indicating the hue and the YUV axes are displayed. In addition, a marker is displayed corresponding to the designation of a pixel in the foreground picture in the center color setting section. Thus, the relation between the inner sphere K1, the outer sphere K2 and each pixel of the foreground picture may be visually grasped easily and accurately, thus simplifying adjustment of chroma key processing.

In the color space display section, too, when the display of the representative points arranged on the surface of the inner sphere K1 and the outer sphere K2 and the display of the center color are held and moved by the mouse 13, the representative points and the center color are changed in accordance with this movement. Thus, the conditions for chroma key processing are changed.

When the representative points and the like are thus set and desired chroma key processing results are confirmed on the preview screen, the editing device 1 carries out subsequent processing by the operation of selection of chroma key processing in the center color setting section and completion of condition setting.

Specifically, in the editing device 1, the latitude $\phi$ and the longitude $\theta$ are sequentially displaced by arithmetic processing by the central processing unit 10, and the distances ri and ro from the origin CO to the boundaries K1 and K2 on the YUV space are calculated (FIG. 9). At this point, in the editing device, the distances ri and ro are calculated by interpolation processing using the latitude $\phi$ and the longitude $\theta$ as parameters (Equations (1) and (2)). In addition, from the result of this calculation, the clip point CLIP and the gain GAIN prescribing the characteristic of the chroma key signal KEY are calculated (FIGS. 11A and 11B). In the editing device 1, the calculated clip point CLIP and gain GAIN are outputted to the key signal generating section 6, and thus, the look-up table 29 (FIG. 2) using the latitude $\phi$ and the longitude $\theta$ as addresses is formed by simple arithmetic processing.

In the editing device 1, if the operator selects color cancel processing, the clip point CLIPC and the gain GAINC prescribing the characteristic of the color cancel key signal are similarly calculated every longitude $\theta$ from the double boundaries set for color cancel. By these calculated clip point CLIPC and gain GAINC, the look-up table 34 for color cancel processing is formed in the key signal generating section 6.

After the loop-up tables 29, 34 are thus formed, if the operator designates preview and editing start, in the editing device 1, the image signal SV 1 of the foreground picture and the image signal SV2 of the background picture are inputted to the chroma key processing section 5 (FIG. 1) by the hard disk drive 2. With respect tot the image signal SV1 of the foreground picture of these image signals, the color-difference signals U1, V1 are over-sampled by the over-sampling circuits 26U, 26V (FIG. 2) of the key signal generating section 6 and thus transformed to digital signals by the same sampling frequency as for the luminance signal.

With respect to the image signal SV1 thus processed, the distance rm from the origin CO and the angle $\theta$ from the reference axis are detected on the UV coordinate plane with the center color CO as the origin, by the coordinate transformation circuit 27 of the chroma key signal generating section 25. Thus, with respect to the image signal SV1, the length rm of the line formed by projecting onto the UV plane the line L connecting the position of each pixel and the origin CO on the YUV space with the center color CO as the origin, and the longitude $\theta$ of the line L on the YUV space are detected.

In addition, with respect to the image signal SV1, the latitude $\phi$ and the distance rM to the origin CO, of the position of each pixel on the YUV space with the center color CO as the origin, are calculated by the coordinate transformation circuit 28, with reference to the distance rm detected by the coordinate transformation circuit 27 and the luminance level Y.

Thus, with respect to the image signal SV1, the look-up table 29 is accessed by using the latitude $\phi$ and the longitude $\theta$ as addresses, and the clip point CLIP and the gain GAIN corresponding to the latitude φ and the longitude θ are set to the key process circuit 30. Thus, with respect to the image signal SV1, the key signal MXK within a range of values 0 to 1 in accordance with the distance rM from the center color CO is generated on the basis of the clip point CLIP and the gain GAIN.

Also, with respect to the image signal SV1, the color-difference signals U1 and V1 outputted from the over-sampling circuits 26U and 26V are inputted to the coordinate transformation circuit 33 of the color cancel key signal generating section 32, where the color of each pixel is detected from the angle θC and the distance rC on the UV plane with the color cancel reference color COC (U0C, V0C) as the origin. In addition, with respect to the image signal SV1, the look-up table 34 is accessed by using the angle θC as an address, the clip point CLIPC and the gain GAINC corresponding to this angle θC are set to the key process circuit 35. Thus, with respect to the image signal SV1, the key signal AMK within a range of values 0 to 1 in accordance with the distance rC from the color cancel reference color COC is generated on the basis of the clip point CLIPC and the gain GAINC.

Thus, with respect to the image signal SV1, the key signal MXK is calculated with reference to the distance rm and the latitude θ on the UV space having the center color CO set as the origin, and the key signal MXK is generated by simple arithmetic processing. By accessing the look-up table 34 preset with reference to the angle θC as the address so as to set the clip point CLIPC and the gain GAINC, the key signal AMK is generated in a short processing time. In addition, as the clip point CLIPC and the gain GAINC prescribe the characteristic of the key signal AMK, the key signal AIMK may be generated without carrying out division processing, so that the processing time is reduced accordingly.

If the operator does not select color cancel processing, in the editing device 1, the key signal CCK of the value 1 is outputted from the color cancel key signal generating section 32. Thus, the image signal SV1 is inputted to the subsequent keyers 21Y, 21U, 21V without being processed by the color cancel circuits 20Y, 20U, 20V (FIG. 12). The image signal SV1 is weighted by the key signal KEY (MXK) outputted from the chroma key signal generating section 25, and is then added by the subsequent mixers 23Y, 23U, 23V to the image signal SV2 outputted from the keyers 22Y, 22U, 22V. At this point, since the image signal SV2 is weighted by the key signal 1−KEY (1−MXK) at the keyers 22Y, 22U, 22V, the image signal SV3 processed by chroma key processing as expressed by Equation (15) is outputted from the mixers 23Y, 23U, 23V.

On the other hand, if the operator selects the first color cancel processing, in the editing device 1, the key signal CCK (1−AMK) is outputted from the color cancel key signal generating section 32 with respect to the color-difference signals. Thus, with respect to the image signal SV1, the color-difference signals U1, V1 are weighted by the key signal CCK at the color cancel circuits 20Y, 20U, 20V, and are then inputted to the subsequent keyers 21Y, 21U, 21V. The image signal SV1 is weighted by the key signal KEY (MXK) outputted from the chroma key signal generating section 25, and is added by the subsequent mixers 23Y, 23U, 23V to the image signal SV2 weighted by the key signal 1−KEY (1−MXK). Thus, the image signal SV3 processed by chroma key processing as expressed by Equation (16) is outputted from the mixers 23Y, 23U, 23V.

If the operator selects the second cancel processing, the image signal SV1 is weighted by the key signal CCK (1−AMK) at the color cancel circuits 20Y, 20U, 20V, and is then weighted by the key signal KEY (AMK) at the subsequent keyers 21Y, 21U, 21V. The image signal SV1 is then added by the subsequent mixers 23Y, 23U, 23V to the image signal SV2 weighted by the key signal 1−KEY (1−AMK). Thus, the image signal SV3 processed by chroma key processing as expressed by Equation (17) is outputted from the mixers 23Y, 23U, 23V.

In this manner, with respect to the image signal SV3 formed by synthesizing the foreground picture and the background picture, the key signal MXK is generated with reference to the luminance signal level and the color-difference signal level of the image signal SV1, for example, the key signal MXK is generated by discriminating light blue and dark blue. Thus, a synthetic picture of high definition having no incongruity may be provided.

The effect of the above-described first embodiment of the present invention will now be described.

According to the key signal generating device having the above-described structure, the position of each pixel of the foreground picture is expressed in the form of polar coordinate in the three-dimensional YUV color space having the center color of a color to be extracted from the foreground picture as the origin, and the key signal KEY (MXK) is generated in accordance with the distance RM from the origin in this polar coordinate. Thus, with a simple structure, the key signal KEY (MXK) may be generated also with reference to the luminance of the foreground picture. For example, the key signal MXK may be generated by discriminating light blue and dark blue, and a synthetic picture of high definition having no incongruity may be provided.

In addition, the boundaries K1 and K2 are set to surround the origin CO so as to generate the key signal KEY in accordance with the position of each pixel with respect to the boundaries K1 and K2. Thus, the setting of the chroma key characteristic may be freely changed by changing the boundaries K1 and K2 in various manners, and easiness in handling may be improved accordingly.

Also, after the chroma key characteristic at each latitude and longitude is detected by using the look-up table, the key signal KEY is generated on the basis of the detected characteristic. Thus, the key signal may be generated simply and in a short time.

In addition, since the characteristic is set by using the clip point and the gain, arithmetic processing required for generating the key signal KEY may be simplified accordingly.

Also, after the distance rm and angle θ of a line formed by projecting the line connecting the center color CO and each pixel onto the UV plane are detected, the latitude φ, the longitude θ and the distance rM are detected. Thus, the position of each pixel on the YUV color space may be expressed by polar coordinate by simple arithmetic processing, and the time required for generating the key signal may be reduced accordingly.

Moreover, each of the boundaries K1 and K2 is expressed by 26 points, and the coordinate values of these groups of points are interpolated to form the look-up table. Thus, the conditions for chroma key processing may be changed in various ways by deforming the boundaries K1 and K2 in various manners using simple arithmetic processing, and the look-up table may be formed by simple arithmetic processing.

Also, since the three-dimensional color space is formed with reference to the luminance signal level and the color-difference signal level, an image signal of a digital signal format (for example, so-called D1 format) processed by this type of editing device may be easily processed to generate the key signal.

In addition to these structures, the color cancel key signal is generated by similar processing. Thus, a synthetic picture of high definition may be generated simply in a short time.

According to the editing device having the above-described structure, since the result of processing by the key signal and the key signal characteristic setting screen are displayed, the processing result may be confirmed in real time and the characteristic of the key signal may be changed in the interactive mode. Also, the processing result may be intuitively grasped and detailed adjustment may be carried out, if necessary. Even when each pixel of the foreground picture is expressed and processed by chroma key processing on the three-dimensional color space, desired processing may be carried out by simple operation.

At this point, since the processing result is displayed together with the foreground picture, the background picture and the key signal picture, the contents of processing may be visually grasped by comparison between these pictures, and the adjustment precision may be improved accordingly.

Also, the characteristic setting screen is constituted by the color space display section in which the three-dimensional color space is viewed from a desired viewpoint, and the vector scope display section in which the three-dimensional space is projected onto a predetermined reference plane. Thus, the characteristic of the key signal may be changed through any one of the screens, if necessary. Even when each pixel is expressed and processed by chroma key processing on the three-dimensional color space, easiness in handling may be improved.

In addition to these features, since the characteristic of the key signal may be changed by changing the representative points using an operating element including the scroll bar, the processing target pixel may be grasped by a numerical value so as change the characteristic of the key signal.

A second embodiment of the present invention will now be described.

The editing device of the second embodiment has the same structure as that of the first embodiment, except for processing procedures in the central processing unit. In this embodiment, an automatic setting button for chroma key processing conditions is arranged in the center color setting section of the key parameter setting screen of the first embodiment. The automatic setting button is arranged separately for representative points of the inner sphere K1 and for representative points of the outer sphere K2.

The central processing unit carries out the same processing procedures as those in the central processing unit 10 of the editing device 1 of the first embodiment, except for processing related to the automatic setting button. When the foreground picture is clicked by the mouse 13 after the automatic setting button for the representative points of the inner sphere K1 or the outer sphere K2 is operated by mouse 13, the central processing unit carries out processing procedures shown in FIG. 35, thereby changing the position of the representative point so as to replace each clicked pixel with the background picture or so as not to replace each clicked pixel with the background picture.

Specifically, the central processing unit shifts from step SP40 to step SP41 so as to obtain the clicked coordinate and read out picture data at the clicked position from the frame buffer 3. Then, the central processing unit detects the luminance level y and the color-difference levels u, v of the picture data, and carries out arithmetic processing of Equations (18) to (20) using the results of this detection so as to calculate the distance d from the center color CO (Y0, U0, V0) and the angles p and t in the θ-direction and the φ-direction based on the center color CO as the origin.

Then, the central processing unit shifts to step SP42 so as to determine whether or not a representative point exists within a predetermined angular range, from the detected angles p and t. If a representative point having angles θ and φ proximate to the angles p and t exists, the central processing unit shifts to step SP43 so as to change the coordinate value of this neighboring representative point. Specifically, if the operator operates the automatic setting button for the representative point of the inner sphere K1, the central processing unit changes the distance of the corresponding representative point so that the distance from the center color CO (Y0, U0, V0) is increased by a predetermined value with respect to the distance d from the center color CO (Y0, U0, V0) calculated at step SP41. If the operator operates the automatic setting button for the representative point of the inner sphere K2, the central processing unit changes the distance of the corresponding representative point so that the distance from the center color CO (Y0, U0, V0) is decreased by a predetermined value with respect to the distance d from the center color CO (Y0, U0, V0) calculated at step SP41.

Having thus changed the representative point, the central processing unit shifts to step SP44 so as to determine whether or not the foreground picture is clicked again. If a positive result is obtained, the central processing unit returns to step SP41. If a negative result is obtained at step SP42, the central processing unit shifts to step SP46 so as to change the coordinate of neighboring four representative points having angles θ and φ proximate to the angles p and t so that the distance r (φ, θ) from the center color CO (Y0, U0, V0) expressed by arithmetic processing of the following equation corresponds to the condition set at step SP43.

$$r(\phi, \theta) = \frac{S}{(\theta 1 + \theta 2) \cdot (\phi 1 + \phi 2)} \quad (21)$$

$$S = (roa+x) \cdot \theta 2 \cdot \phi 2 + (rob+x) \cdot \theta 1 \cdot \phi 2 + (roc+x) \cdot \theta 2 \cdot \phi 1 + (rod+x) \cdot \theta 1 \cdot \phi 1$$

In this case, if the operator operates the automatic setting button for the representative point of the inner sphere K1, the central processing unit sets a value x so that the distance from the center color CO (Y0, U0, V0) is increased with respect to the distance d from the center color CO (Y0, U0, V0) calculated at step SP41, and changes the distance of these neighboring representative points. On the other hand, if the operator operates the automatic setting button for the representative point of the inner sphere K2, the central processing unit sets a value x so that the distance from the center color CO (Y0, U0, V0) is decreased with respect to the distance d from the center color CO (Y0, U0, V0) calculated at step SP4 1, and changes the distance of these neighboring representative points.

After changing the neighboring four representative points by the equal distance x, the central processing unit shifts to step SP44. The central processing unit sequentially changes the coordinate of the representative points in response to the operation by the operator. On completion of the operation by the operator, the central processing unit shifts from step SP44 to step SP47 to end the processing procedures.

The effect of the above-described second embodiment will now be described.

Figure 35:
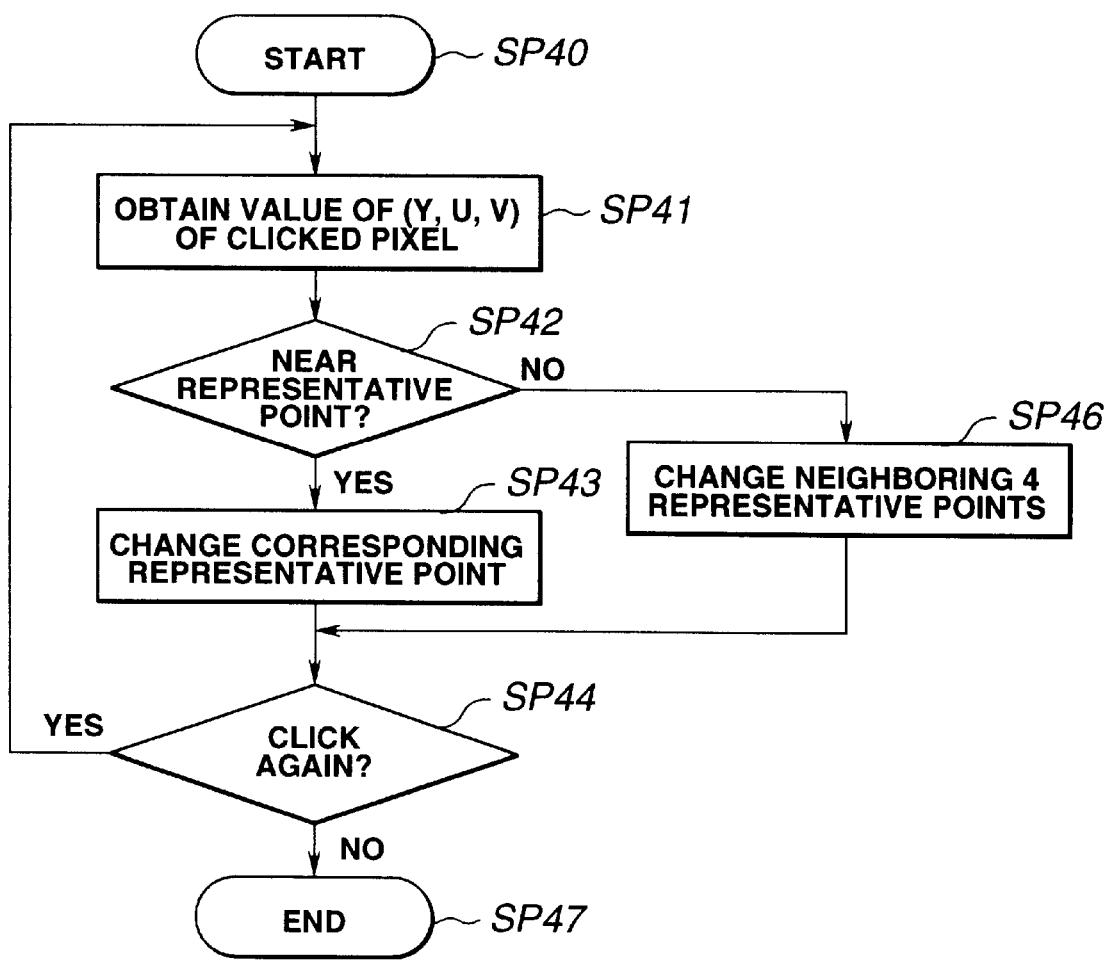
FIG. 35 is a flowchart showing processing procedures of a central processing unit of a second embodiment.

As shown in FIG. 35, even when the characteristic of the key signal is automatically set by changing the representative point in response to the operation by the user, since the processing result and the characteristic setting screen are displayed, the processing result may be confirmed in real time so as to enable detailed adjustment, if necessary. Thus, even when each pixel of the foreground picture is expressed and processed by chroma key processing on the three-dimensional color space, desired processing may be carried out by simple operation.

Other embodiments will now be described.

Although in the above-described embodiment, the boundary for chroma key processing is expressed by 26 point, this invention is not limited to such embodiment. For example, in the case where points are set at a conformal spacing of 30 degrees or in the case where points are set at a non-conformal spacing, the boundary may be expressed by various numbers of points, if necessary.

Also, though in the above-described embodiment, the boundary for chroma key processing is set by using double substantially spherical shapes, this invention is not limited to such embodiment. For example, this invention may also be applied to the case where triple boundaries are set so that the chroma key processing characteristic is set further in detail with reference to the intermediate boundary.

Also, in the above-described embodiment, the latitude and longitude are changed to calculate the distance to the boundary in advance, and the look-up table is formed from the result of this calculation so as to generate the key signal. However, this invention is not limited to such embodiment. The distance to the boundary may be sequentially calculated corresponding to each pixel of the foreground picture so as to generate the key signal. Also, since it often occurs that the same luminance signal level and color-difference signal level continue between adjacent pixels in the image signals, the latitude and longitude once calculated may be utilized in sequentially calculating the distance to the boundary.

In addition, in the above-described embodiment, the look-up table is accessed with reference to the latitude and longitude, thereby sequentially setting the key signal level in accordance with the distance from the center color with respect to all the pixels of the foreground picture. However, this invention is not limited to such embodiment. This invention may also be applied to the case where the key signal level is detected by accessing the look-up table or by arithmetic processing only with respect to part of pixels sampled from the foreground picture so that the key signal level for the other pixels is set from the detected key signal level by using interpolation processing.

Also, in the above-described embodiment, each pixel of the foreground picture is expressed by the YUV color space having the center color of a color to be extracted as the origin so as to generate the key signal. However, this invention is not limited to such embodiment. For example, each pixel of the foreground picture may be expressed by a color space with reference to the color signal levels of red, blue and green, instead of the YUV color space. In this manner, by connecting the device of this invention to various equipments for processing image signals by these color signals, the key signal may be generated by a simple structure.

In addition, in the above-described embodiment, the key signal for color cancel processing is generated in addition to the key signal for chroma key. However, this invention is not limited to such embodiment, and may also be applied broadly to the case where only the key signal for chroma key is generated or the case where other key signals for editing are generated.

Also, in the above-described embodiment, the key signal is generated and picture synthesis is carried out by using the generated key signal. However, this invention is not limited to such embodiment, and may also be applied broadly to the case where the generated key signal is outputted to a switcher or the like.

Moreover, in the above-described embodiment, continuous pictures constituted by image signals are processed by chroma key processing. However, this invention is not limited to such embodiment, and may also be applied broadly to the case where still pictures are processed by chroma key processing.

Figure 36:
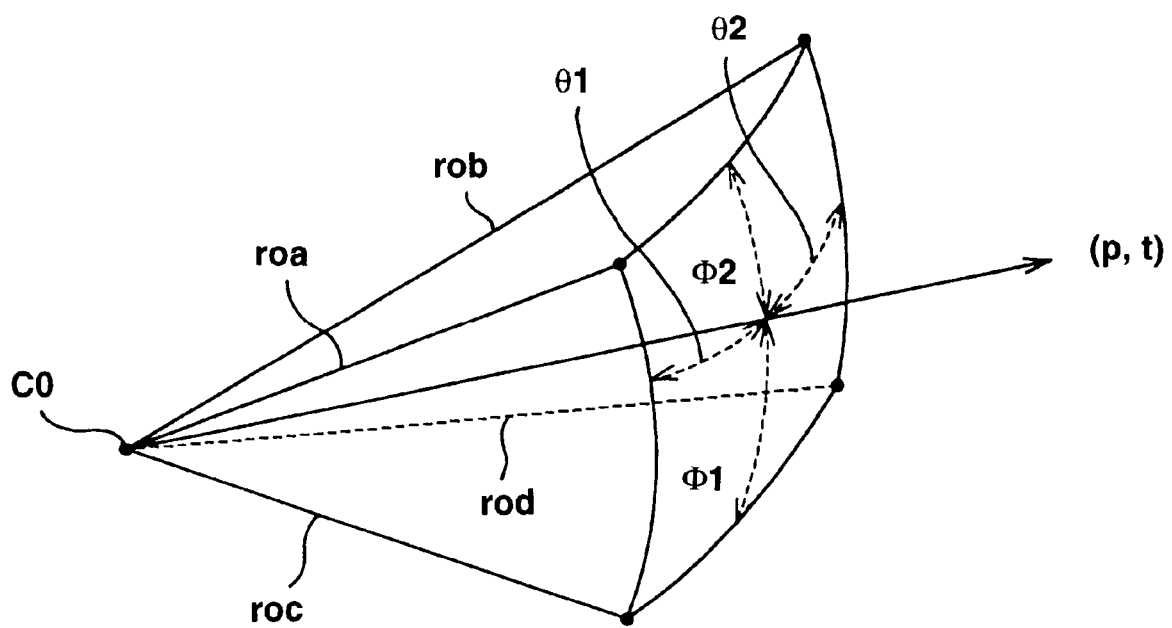
FIG. 36 illustrates processing for changing a representative point in another embodiment.

Also, in the above-described second embodiment, the conditions for chroma key processing are automatically set by correcting the neighboring four representative points by an equal distance. However, this invention is not limited to such embodiment, and the distance may also be correct by carrying out weighting in accordance with the angle from a pixel clicked by the user. That is, as shown in FIG. 36, in the case where a pixel clicked by the user internally divides the neighboring four representative points by angles $\theta 1$, $\theta 2$, $\phi 1$ and $\phi 2$, the distance of each representative point is corrected by calculating respective values xa, xb, xc and xd so that the distance r ($\phi$, $\theta$) corresponds to the distance d detected at step SP41 in accordance with the following arithmetic processing, thus enabling weighting to change the representative points. In this manner, the conditions for chroma key processing may be automatically set further in detail.

$$r(\phi, \theta) = \frac{S}{(\theta 1 + \theta 2) \cdot (\phi 1 + \phi 2)} \quad (22)$$

$$S = (roa+x) \cdot \theta 2 \cdot \phi 2 + (rob+x) \cdot \theta 1 \cdot \phi 2 + (roc+x) \cdot \theta 2 \cdot \phi 1 + (rod+x) \cdot \theta 1 \cdot \phi 1$$

xa:xb=$\theta 2$:$\theta 1$ xa:xc=$\phi 1$:$\phi 2$ xc:xd=$\theta 2$:$\theta 1$

Also, in the above-described second embodiment, designation by the user is accepted with respect to a portion to be replaced with the background and a portion not to be replaced with the background. However, this invention is not limited to such embodiment, the designation by the user may be accepted only with respect to either one portion, or may be accepted with respect to a range setting the key signal to a value of 0 to 1.

In addition, in the above-described embodiment, the reference plane perpendicular to the Y-axis with reference to the center color is set so as to form the first to third display sections, in the vector scope display section. However, this invention is not limited to such embodiment, and may also be applied broadly to the cases where various forms of displays are made, for example, the case where the first to third display sections are formed by a reference plane with reference to the origin of the UVY axes.

Moreover, in the above-described embodiment, the inner sphere and the outer sphere are displayed by lines in the vector scope display section. However, this invention is not limited to such embodiment, and an area within the inner sphere, an area within the outer sphere and an area between the inner and outer spheres may be displayed by displaying an area corresponding to the value of the key signal.

In addition, in the above-described embodiment, the display is updated every time the representative point and the center color are changed in the vector scope display section. However, this invention is not limited to such embodiment. In the vector scope display section, update processing may be omitted by enabling grasp of the general relation between the inner sphere, the outer sphere and the foreground picture.

Also, in the above-described embodiment, the key signal characteristic setting screen is formed by the color space display section and the vector scope display section. However, this invention is not limited to such embodiment, and may also be applied broadly to the case where the key signal characteristic setting screen is formed in various forms, if necessary.

Also, though in the above-described embodiment, the boundary for chroma key processing is expressed by 26 points, this invention is not limited to such embodiment. For example, in the case where points are set at a conformal spacing of 30 degrees or in the case where points are set at a non-conformal spacing, the boundary may be expressed by various numbers of points, if necessary.

In addition, in the above-described embodiment, the boundary for chroma key processing is set by double substantially spherical shapes. However, this invention is not limited to such embodiment, and may also be applied to the case where triple boundaries are set so that the characteristic of chroma key processing is set further in detail with reference to the intermediate boundary.

Also, in the above-described embodiment, in the case where each pixel of the foreground picture is expressed by the YUV color space having the center color of a color to be extracted as the origin so as to generate the key signal, distribution of pixels of the foreground picture is displayed in the vector scope display section. However, this invention is not limited to such embodiment, and may also be applied broadly to the case where each pixel of the foreground picture is expressed by a color space with reference to color signal levels of red, blue, and green, and the case where the foreground picture is expressed and processed on the UV two-dimensional plane similar to that of the conventional technique.

What is claimed is:

1. A key signal generating device for generating a key signal for synthesizing a foreground picture and a background picture, the device comprising:

polar coordinate generating means for detecting a polar coordinate of each pixel of the foreground picture in a three-dimensional color space having a center color of a color to be extracted from the foreground picture as an origin; and key signal generating means for generating the key signal in accordance with the distance of the polar coordinate from the origin.

2. The key signal generating device as claimed in claim 1, wherein the key signal generating means sets a boundary to surround the origin in the color space and generates the key signal in accordance with the position of each pixel with respect to the boundary from the distance.

3. The key signal generating device as claimed in claim 2, wherein the key signal generating means prescribes the boundary by a group of points set at a predetermined spacing in the color space, carries out interpolation of polar coordinate values of the group of adjacent points so as to detect the distance of the boundary from the origin corresponding to the polar coordinate value of the pixel, and generates the key signal with reference to the distance of the boundary.

4. The key signal generating device as claimed in claim 2, wherein the key signal generating means forms the boundary in double, sets the key signal to allocate the background picture, in the case where the pixel is located on the inner side of an inner boundary, sets the key signal to allocate the foreground picture, in the case where the pixel is located on the outer side of an outer boundary, and sets the key signal to carry out weighting and addition of the foreground picture and the background picture and allocate the foreground picture and the background picture in accordance with the position of the pixel, in the case where the pixel is located between the inner boundary and the outer boundary.

5. The key signal generating device as claimed in claim 2, wherein the key signal generating means has a look-up table formed therein at every predetermined angle in the color space, the look-up table having the distance to the boundary recorded thereon, and generates the key signal by accessing the look-up table using the angle of each pixel in the color space as an address.

6. The key signal generating device as claimed in claim 4, wherein the key signal generating means has a look-up table on which the distance to the boundary is recorded, at every predetermined angle in the color space, and generates the key signal by accessing the look-up table using the angle of each pixel in the color space as an address, the look-up table being formed by distance information about the distance to the inner or outer boundary, and gain information indicating a change in value of the key signal per unit distance between the inner boundary and the outer boundary.

7. The key signal generating device as claimed in claim 1, wherein the key signal generating means detects the distance and angle in a two-dimensional space, formed by projecting a line connecting the origin and each pixel on a predetermined plane on the color space, and then detects a key signal in accordance with the distance in the color space on the basis of the distance and angle in the two-dimensional space.

8. The key signal generating device as claimed in claim 1, wherein the color space is constituted by a color space using a luminance signal level and color-difference signal levels as reference axes.

9. The key signal generating device as claimed in claim 1, further comprising color cancel key signal generating means for generating a key signal for color cancel processing for restraining the signal level of the foreground picture, the color cancel key signal generating means detecting a polar coordinate of each pixel of the foreground picture in a two-dimensional color plane with reference to color-difference signal levels having a center color to be color-cancelled as an origin, the color cancel key signal generating means generating the key signal for color cancel processing in accordance with the distance of the polar coordinate from the origin.

10. A key signal generating method for generating a key signal for synthesizing a foreground picture and a background picture, comprising the steps of;

setting a value of the key signal in accordance with the distance from a predetermined reference color to each pixel of the foreground picture in a three-dimensional color space, displaying a picture as a result of processing by the key signal and a characteristic setting screen for the key signal, and changing characteristics of the key signal using information obtained through the characteristic setting screen, and the picture as a result of processing.

11. The key signal generating method as claimed in claim 10, wherein the foreground picture, the background picture, and a picture of the key signal are displayed together with the picture as a result of processing.

12. The key signal generating method as claimed in claim 10, wherein the characteristic setting screen includes a picture formed by viewing, from a desired viewpoint, a three-dimensional color space in which a pattern indicating pixels of the foreground picture and/or the characteristics of the key signal is arranged.

13. The key signal generating method as claimed in claim 10, wherein the characteristic setting screen includes a picture formed by projecting, onto a predetermined reference plane, a three-dimensional color space in which a pattern indicating pixels of the foreground picture and/or the characteristics of the key signal is arranged.

14. A key signal generating method for generating a key signal for synthesizing a foreground picture and a background picture, comprising the steps of;
setting a value of the key signal in accordance with the distance of each pixel of the foreground picture from a reference center color in a three-dimensional color space, and
displaying position information of a pixel designated in the foreground picture from a predetermined reference position in the three-dimensional color space.

15. The key signal generating method as claimed in claim 14, wherein the reference position is the position of the center color,
the position information including the distance and direction from the center color.

16. The key signal generating method as claimed in claim 15, wherein information for key signal setting is accepted in a format corresponding to the position information, and conditions for generating the key signal are set in accordance with the accepted information.

17. The key signal generating method as claimed in claim 15, wherein a boundary surrounding the center color is expressed by a group of points set in the three-dimensional color space so as to set a value of the key signal in accordance with each pixel of the foreground picture with reference to the boundary, and
a polar coordinate value of at least one point of the group of points is corrected in accordance with the position information so as to set conditions for generating the key signal in accordance with the position information.

18. The key signal generating method as claimed in claim 14, wherein information for key signal setting is accepted in a format corresponding to the position information, and conditions for generating the key signal are set in accordance with the accepted information.

19. A key signal generating method for generating a key signal for synthesizing a foreground picture and a background picture, comprising the step of;
projecting a pixel forming the foreground picture on a reference plane set on a three-dimensional color space so as to display the position of the pixel forming the foreground picture on the three-dimensional color space.

20. The key signal generating method as claimed in claim 19, wherein the reference plane is constituted by a plane perpendicularly crossing a reference axis of luminance level in the three-dimensional color space, and is set at every predetermined luminance level,
the key signal generating method segmenting pixels of the foreground picture with reference to the luminance level of each reference plane so as to selectively project the pixel of each segment onto the corresponding reference plane.

21. The key signal generating method as claimed in claim 20, wherein each pixel is displayed by projecting onto the reference plane in accordance with the hue of each pixel and the luminance level of the corresponding reference plane.

22. The key signal generating method as claimed in claim 20, wherein a value of the key signal is set in accordance with the distance from a predetermined reference color on the three-dimensional color space.

23. The key signal generating method as claimed in claim 22, wherein an area corresponding to the key signal is displayed on the reference plane.

24. The key signal generating method as claimed in claim 23, wherein a change of the area corresponding to the value of the key signal on the reference plane is accepted by operating a pointing device, and
the value of the key signal with respect to the distance from the reference color is changed in response to the change.

25. The key signal generating method as claimed in claim 19, wherein a value of the key signal is set in accordance with the distance from a predetermined reference color on the three-dimensional color space.

26. The key signal generating method as claimed in claim 25, wherein an area corresponding to the value of the key signal is displayed on the reference plane.

27. The key signal generating method as claimed in claim 26, wherein a change of the area corresponding to the value of the key signal on the reference plane is accepted by operating a pointing device, and
the value of the key signal with respect to the distance from the reference color is changed in response to the change.

28. The key signal generating method as claimed in claim 19, wherein each pixel is displayed by projecting onto the reference plane in accordance with the hue of each pixel and the luminance level of the corresponding reference plane.

29. A key signal generating method for generating a key signal for synthesizing a foreground picture and a background picture, comprising the steps of;
setting a value of the key signal in accordance with the distance from a predetermined reference color in a three-dimensional color space, and
displaying a picture viewed from a desired viewpoint using each pixel of at least the foreground picture which is located at a corresponding position on the three-dimensional color space.

30. The key signal generating method as claimed in claim 29, wherein the position of the viewpoint is changed in response to the operation of an operating element.

31. The key signal generating method as claimed in claim 30, wherein an area corresponding to the value of the key signal is displayed in the picture.

32. The key signal generating method as claimed in claim 31, wherein a change of the area is accepted on the picture.

33. The key signal generating method as claimed in claim 29, wherein a reference color expressing the hue in the three-dimensional color space is displayed in the picture.

34. The key signal generating method as claimed in claim 29, wherein a reference axis in the three-dimensional color space is displayed in the picture.

35. A key signal generating method for generating a key signal for synthesizing a foreground picture and a background picture, the method comprising:
a step of detecting a polar coordinate of each pixel of the foreground picture in a three-dimensional color space having a center color of a color to be extracted from the foreground picture as an origin; and a step of generating the key signal in accordance with the distance of the polar coordinate from the origin.

36. A picture synthesizing device for synthesizing a foreground picture and a background picture in accordance with a key signal, the key signal being generated by using polar coordinate generating means for detecting a polar coordinate of each pixel of the foreground picture in a three-dimensional color space having a center color of a color to be extracted from the foreground picture as an origin, and key signal generating means for generating the key signal in accordance with the distance of the polar coordinate from the origin.

37. A picture synthesizing device for synthesizing a foreground picture and a background picture in accordance with a key signal from a key signal generating section, the key signal generating section setting a value of the key signal in accordance with the distance from a predetermined reference color to each pixel of the foreground picture in a three-dimensional color space, displaying a picture as a result of processing by the key signal and a characteristic setting screen for the key signal, and changing characteristics of the key signal by information obtained through the characteristic setting screen, and changing the picture as a result of processing.

38. A picture synthesizing device for synthesizing a foreground picture and a background picture in accordance with a key signal from a key signal generating section, the key signal generating section setting a value of the key signal in accordance with the distance of each pixel of the foreground picture from a reference center color in a three-dimensional color space, and displaying position information of a pixel designated in the foreground picture from a predetermined reference position in the three-dimensional color space.

39. A picture synthesizing device for synthesizing a foreground picture and a background picture in accordance with a key signal from a key signal generating section, the key signal generating section projecting a pixel forming the foreground picture onto a reference plane set on a three-dimensional color space so as to display the position of the pixel forming the foreground picture on the three-dimensional color space.

40. A picture synthesizing device for synthesizing a foreground picture and a background picture in accordance with a key signal from a key signal generating section, the key signal generating section setting a value of the key signal in accordance with the distance from a predetermined reference color in a three-dimensional color space, and locating each pixel of at least the foreground picture at a corresponding position on the three-dimensional color space so as to display a picture viewed from a desired viewpoint.

41. An editing device for synthesizing a foreground picture and a background picture in accordance with a key signal from a key signal generating section, editing a plurality of frames including synthesized frames, and outputting the edited frames, the key signal generating section including polar coordinate generating means for detecting a polar coordinate of each pixel of the foreground picture in a three-dimensional color space having a center color of a color to be extracted from the foreground picture as an origin; and key signal generating means for generating the key signal in accordance with the distance of the polar coordinate from the origin.

42. An editing device for synthesizing a foreground picture and a background picture in accordance with a key signal from a key signal generating section, editing a plurality of frames including synthesized frames, and outputting the edited frames, the key signal generating section setting a value of the key signal in accordance with the distance from a predetermined reference color to each pixel of the foreground picture in a three-dimensional color space, displaying a picture as a result of processing by the key signal and a characteristic setting screen for the key signal, and changing characteristics of the key signal by information obtained through the characteristic setting screen, and changing the picture as a result of processing.

43. An editing device for synthesizing a foreground picture and a background picture in accordance with a key signal from a key signal generating section, editing a plurality of frames including synthesized frames, and outputting the edited frames, the key signal generating section setting a value of the key signal in accordance with the distance of each pixel of the foreground picture from a reference center color in a three-dimensional color space, and displaying position information of a pixel designated in the foreground picture from a predetermined reference position in the three-dimensional color space.

44. An editing device for synthesizing a foreground picture and a background picture in accordance with a key signal from a key signal generating section, editing a plurality of frames including synthesized frames, and outputting the edited frames, the key signal generating section projecting a pixel forming the foreground picture onto a reference plane set on a three-dimensional color space so as to display the position of the pixel forming the foreground picture on the three-dimensional color space.

45. An editing device for synthesizing a foreground picture and a background picture in accordance with a key signal from a key signal generating section, editing a plurality of frames including synthesized frames, and outputting the edited frames, the key signal generating section setting a value of the key signal in accordance with the distance from a predetermined reference color in a three-dimensional color space, and locating each pixel of at least the foreground picture at a corresponding position on the three-dimensional color space so as to display a picture viewed from a desired viewpoint.

\* \* \* \* \*